United States Patent
Toba

(10) Patent No.: US 8,395,706 B2
(45) Date of Patent: Mar. 12, 2013

(54) INFORMATION PROCESSING SYSTEM, DISPLAY DEVICE, OUTPUT DEVICE, INFORMATION PROCESSING DEVICE, IDENTIFICATION INFORMATION ACQUISITION METHOD AND IDENTIFICATION INFORMATION SUPPLY METHOD

(75) Inventor: Kazuaki Toba, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/998,260

(22) PCT Filed: Sep. 3, 2009

(86) PCT No.: PCT/JP2009/065412
§ 371 (c)(1),
(2), (4) Date: Mar. 31, 2011

(87) PCT Pub. No.: WO2010/044318
PCT Pub. Date: Apr. 22, 2010

(65) Prior Publication Data
US 2011/0176056 A1    Jul. 21, 2011

(30) Foreign Application Priority Data

Oct. 16, 2008  (JP) .................................. 2008-267896
Jan. 9, 2009  (JP) .................................. 2009-003124

(51) Int. Cl.
*H04N 7/00* (2006.01)
*H04N 5/44* (2006.01)

(52) U.S. Cl. ....................................... 348/552; 348/553

(58) Field of Classification Search .................. 348/552, 348/553, 722, 725; 725/131, 133, 139, 141, 725/151, 153; H04N 7/00, 11/00, 5/44, 5/222, H04N 7/173, 7/16
See application file for complete search history.

(56) References Cited

U.S. PATENT DOCUMENTS 7,119,855 B2 * 10/2006 Fujiwara et al. .............. 348/552
2003/0023987 A1 * 1/2003 Hiramoto et al. ............. 725/141
(Continued)

FOREIGN PATENT DOCUMENTS

| EP | 0959622 A2 | 11/1999 |
| EP | 1931139 A1 | 6/2008 |

(Continued)

OTHER PUBLICATIONS

Supplementary European Search Report EP 09820496, dated Nov. 8, 2012.

*Primary Examiner* — Sherrie Hsia
(74) *Attorney, Agent, or Firm* — Lerner, David, Littenberg, Krumholz & Mentlik, LLP

(57) ABSTRACT

A display device includes a receiving unit for receiving output data relating to a content transmitted from an information processing device, a display unit for providing a display based on the output data received by the receiving unit, a transmitting unit for transmitting a setting change request to an output device for providing an output based on the output data via the information processing device, a display generation unit for generating a setting change screen on the basis of setting information transmitted from the output device via the information processing device in response to the setting change request, and an operation detection unit for detecting a user operation. The transmitting unit transmits the contents of the setting change based on the user operation detected by the operation detection unit in the setting change screen to the output device via the information processing device.

13 Claims, 17 Drawing Sheets

U.S. PATENT DOCUMENTS

| | | |
|---|---|---|
| 2003/0204589 A1 | 10/2003 | Ishizuka |
| 2005/0141857 A1 | 6/2005 | Shimozawa et al. |
| 2009/0073316 A1 | 3/2009 | Ejima |

FOREIGN PATENT DOCUMENTS

| | | |
|---|---|---|
| JP | 2007-184745 A | 7/2007 |
| JP | 2007-311847 A | 11/2007 |
| JP | 2008-153974 A | 7/2008 |
| WO | WO-2006/118106 A1 | 11/2006 |
| WO | 2008013132 A1 | 1/2008 |

* cited by examiner

INFORMATION PROCESSING SYSTEM, DISPLAY DEVICE, OUTPUT DEVICE, INFORMATION PROCESSING DEVICE, IDENTIFICATION INFORMATION ACQUISITION METHOD AND IDENTIFICATION INFORMATION SUPPLY METHOD

CROSS-REFERENCES TO RELATED APPLICATIONS

The present application is a national phase entry under 35 U.S.C. §371 of International Application No. PCT/JP2009/065412 filed Sep. 3, 2009, published on Apr. 22, 2010 as WO 2010/044318 A1, which claims priority from Japanese Patent Application No. JP 2008-267896 filed in the Japanese Patent Office on Oct. 16, 2008 and Japanese Patent Application No. JP2009-003124 filed in the Japanese Patent Office on Jan. 9, 2009.

TECHNICAL FIELD

The present invention relates to an information processing system, a display device, an output device, an information processing device, an identification information acquisition method, and an identification information supply method.

BACKGROUND ART

The user sometimes views the content by displaying the video data of the content on the display device, and outputting the audio data of the content from an audio output device. If the display device and the audio output device are directly connected with a bi-directionally communicable transmission path, the display device can receive the setting information of the audio output device and display a GUI for changing the setting of the audio output device based on the relevant setting information. As a result, the user can change the setting of the audio output device through the GUI displayed on the display device. Patent literature 1 describes a system for controlling the operation of the display device and the like through a network.

CITATION LIST

Patent Literature

Patent Literature 1: JP 2007-184745 (A)

SUMMARY OF INVENTION

Technical Problem

The display device and the audio output device are both sink devices. Thus, a directly connected communication path does not exist between the display device and the audio output device. In such a case, a problem arises in that the user has to use a restrictive user interface of the audio output device instead of the user interface of the display device to change the setting of the audio output device.

Furthermore, the display device and the audio-output device may not be able to exchange information since the directly connected communication path does not exist between the display device and the audio output device. Thus, the user has to perform a selecting operation of the connecting device independently in each device when desiring to connect the display device and the audio output device to the same source device.

Moreover, as described above, as the directly connected communication path does not exist between the display device and the audio output device, the user has to change the setting of the audio output independently in each device when switching to the audio output from the audio output device while viewing the content on the display device that can output audio.

The present invention is made in view of the above-mentioned issue, and aims to enable the user to smoothly change the setting of the output device (sink device) such as the display device and the audio output device connected to the same source device.

Solution to Problems

To solve the above-described problem, according to an embodiment of the present invention, there is provided an information processing system including an information processing device for transmitting output data of a content, an output device for performing an output based on the output data transmitted from the information processing device, and a display device including a reception unit for receiving the output data transmitted from the information processing device, a display unit for performing a display based on the output data received by the reception unit, a transmission unit for transmitting a setting change request to the output device through the information processing device, a display generation unit for generating a setting change screen based on setting information transmitted from the output device through the information processing device according to the setting change request, and an operation detection unit for detecting a user operation, the transmission unit transmitting a content of setting change based on the user operation detected by the operation detection unit in the setting change screen to the output device through the information processing device.

The information processing device may transmit display data and audio data as the output data, and the output devices may be an audio output device for outputting audio based on the audio data transmitted from the information processing device.

The display device and the output device may further include an interface of a communication path for transmitting audio data in one direction from the display device to the output device, and the output device may output audio based on the audio data transmitted from the information processing device or the audio data transmitted from the display device through the interface. The setting change request may be a setting change request of a parameter involved in the audio output of the output device.

The setting change request transmitted from the transmission unit of the display device to the output device through the information processing device may include identification information of the output device.

The display device may further include an identification information acquisition unit for acquiring the identification information of the output device.

The identification information acquisition unit may include an operation detection unit for detecting the user operation instructing start of acquisition of the identification information of the output device, an information processing device specifying unit for specifying the information processing device connected with the output device from connectable information processing devices when the user operation is detected by the operation detection unit, and an identification information reception unit for receiving the identification information of the output device from the output device through the information processing device specified by the information processing device specifying unit.

To solve the above-described problem, according to another embodiment of the present invention, there is provided a display device having a reception unit for receiving output data of a content transmitted from an information processing device, a display unit for performing a display based on the output data received by the reception unit, a transmission unit for transmitting a setting change request to the output device, which performs an output based on the output data, through the information processing device, a display generation unit for generating a setting change screen based on setting information transmitted from the output device through the information processing device according to the setting change request, and an operation detection unit for detecting a user operation. The transmission unit may transmit a content of setting change based on the user operation detected by the operation detection unit in the setting change screen to the output device through the information processing device.

The setting change request transmitted from the transmission unit to the output device through the information processing device may include identification information of the output device.

The display device may further include an identification information acquisition unit for acquiring the identification information of the output device.

The identification information acquisition unit may include an operation detection unit for detecting the user operation instructing start of acquisition of the identification information of the output device, an information processing device specifying unit for specifying the information processing device connected with the output device from connectable information processing devices when the user operation is detected by the operation detection unit, and an identification information reception unit for receiving the identification information of the output device from the output device through the information processing device specified by the information processing device specifying unit.

To solve the above-described problem, according to another embodiment of the present invention, there is provided an output device including a reception unit for receiving output data of a content transmitted from an information processing device, an output unit for performing an output based on the output data received by the reception unit, a transmission unit for transmitting setting information of own device through the information processing device to a display device when received a setting change request through the information processing device from the display device that displays based on the output data, and a setting change unit for changing setting of own device according to a user operation in a setting change screen to be displayed on the display device based on the setting information.

To solve the above-described problem, according to another embodiment of the present invention, there is provided an information processing device including a communication unit for transmitting output data of a content to a display device that displays based on the output data and an output device that outputs based on the output data, and a relay processing unit for relaying, to the communication unit, a content of setting change based on a user operation on a setting change screen displayed on the display device based on a setting change request from the display device to the output device, setting information to be transmitted from the output device to the display device according to the setting change request, and the setting information to be transmitted from the display device to the output device.

To solve the above-described problem, according to another embodiment of the present invention, there is provided an output device including a reception unit for receiving output data of a content transmitted from an information processing device, an output unit for performing an output based on the output data received by the reception unit, an identification information acquisition unit for acquiring identification information of another output device through the information processing device, and a transmission unit for sending a message added with the identification information acquired by the identification information acquisition unit or other identification information corresponding to the identification information to the other output device through the information processing device.

The identification information acquisition unit may include an operation detection unit for detecting the user operation instructing start of acquisition of the identification information of the output device, an information processing device specifying unit for specifying the information processing device connected with the other output device from connectable information processing devices when the user operation is detected by the operation detection unit, and an identification information reception unit for receiving the identification information of the other output device from the other output device through the information processing device specified by the information processing device specifying unit.

The message may be a message instructing the other output device to switch the information processing device to receive the output data. The message may be a message instructing the other output device to output based on the output data.

To solve the above-described problem, according to another embodiment of the present invention, there is provided an output device including a reception unit for receiving output data of a content transmitted from an information processing device, an output unit for performing an output based on the output data received by the reception unit, and an identification information acquisition unit for acquiring identification information of another output device, which performs an output based on the output data transmitted from the information processing device, through the information processing device. The identification information acquisition unit may include an operation detection unit for detecting the user operation instructing start of acquisition of the identification information of the other output device, an information processing device specifying unit for specifying the information processing device connected with the other output device from connectable information processing devices when the user operation is detected by the operation detection unit, and an identification information reception unit for receiving the identification information of the other output device from the other output device through the information processing device specified by the information processing device specifying unit.

The output device may further include a transmission unit for transmitting a message to the other output device through the information processing device. The message may be added with the identification information acquired by the identification information acquisition unit or other identification information corresponding to the identification information.

The output device may further include a transmission unit for transmitting a setting change request added with the identification information acquired by the identification information acquisition unit or other identification information corresponding to the identification information to the other output device through the information processing device, a display generation unit for generating a setting change screen based on setting information transmitted from the other output device through the information processing device according to the setting change request, and an operation detection unit for detecting a user operation. The transmission unit may transmit a content of setting change based on the user operation detected by the operation detection unit in the setting change screen to the information processing device.

To solve the above-described problem, according to another embodiment of the present invention, there is provided an identification information acquisition method for an output device, which includes a reception unit for receiving output data of a content transmitted from an information processing device and an output unit for performing an output based on the output data received by the reception unit, to acquire identification information from another output device, the method comprising the steps of detecting the user operation instructing start of acquisition of the identification information of the other output device, specifying the information processing device connected with the other output device from connectable information processing devices when the user operation is detected in the operation detection step, and receiving the identification information of the other output device from the other output device through the information processing device specified in the information processing device specifying step.

To solve the above-described problem, according to another embodiment of the present invention, there is provided an output device including a reception unit for receiving output data of a content transmitted from an information processing device, an output unit for performing an output based on the output data received by the reception unit, and an identification information supply unit for supplying identification information of own device to another output device, which performs an output based on the output data transmitted from the information processing device, through the information processing device. The identification information supply unit may include an operation detection unit for detecting a user operation instructing start of supply of the identification information of the own device, a connection control unit for connecting the own device to a predetermined information processing device when the user operation is detected by the operation detection unit, and an identification information transmission unit for transmitting the identification information of the own device to the other output device through the predetermined information processing device when a request for the identification information is made from the other output device through the predetermined information processing device.

To solve the above-described problem, according to another embodiment of the present invention, there is provided an identification information supply method for an output device, which includes a reception unit for receiving output data of a content transmitted from an information processing device and an output unit for performing an output based on the output data received by the reception unit, to supply identification information to another output device, the method including the steps of detecting a user operation instructing start of supply of the identification information of the own device, connecting the own device to a predetermined information processing device when the user operation is detected in the operation detection step, and transmitting the identification information of the own device to the other output device through the predetermined information processing device when a request for the identification information is made from the other output device through the predetermined information processing device.

Advantageous Effects of Invention

As described above, according to the information processing system, the display device, the output device, the information processing device, the identification information acquisition method and the identification information supply method of the present invention, the user can smoothly change the setting of the output device (sink device) such as the display device and the audio output device connected to the same source device.

DESCRIPTION OF EMBODIMENTS

Figure 1:
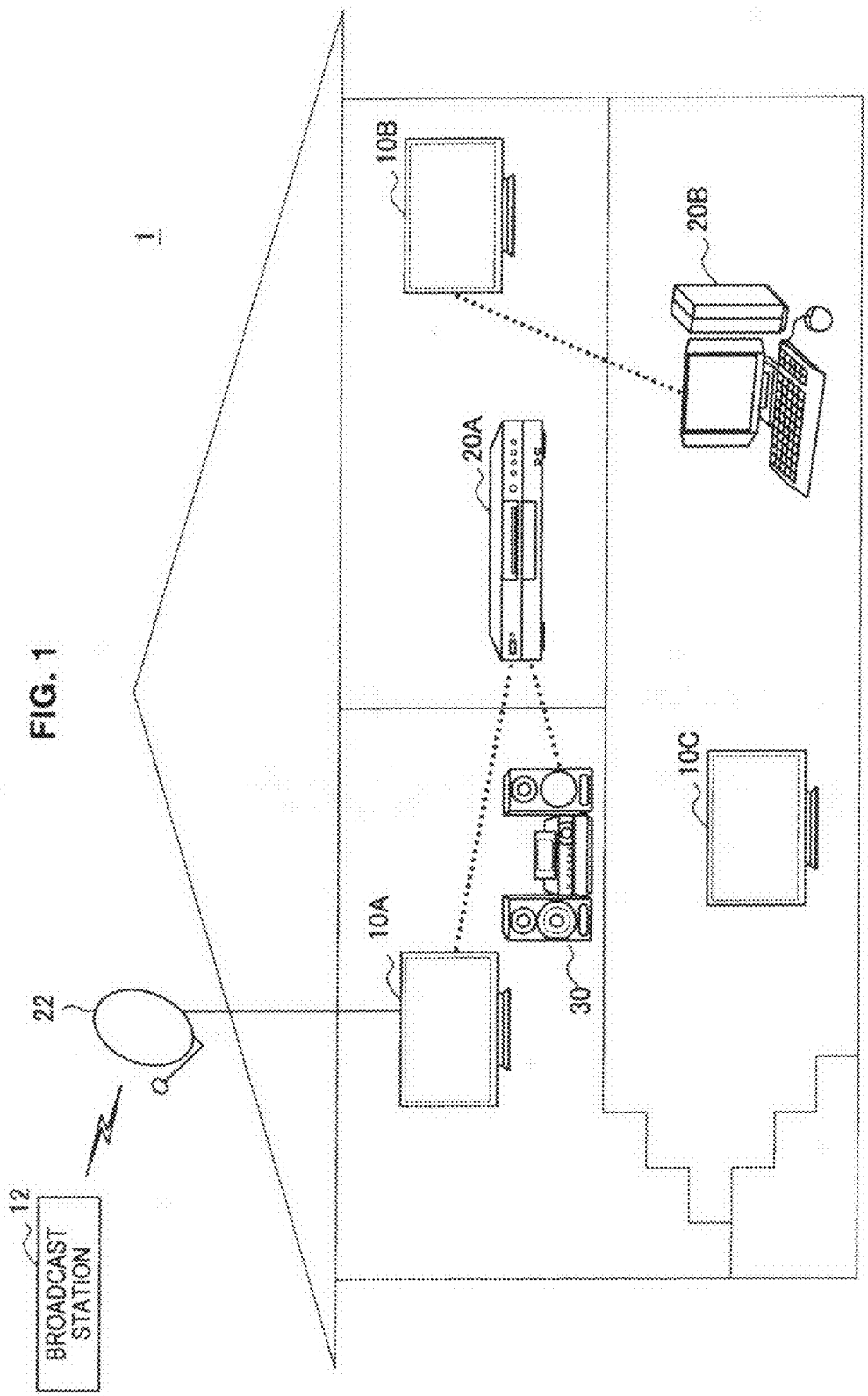
FIG. 1 is an explanatory view showing an overall configuration example of an information processing system according to the present embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The "Best Mode for Carrying out the Invention" will be described according to the following order of items.

1. Overall configuration of information processing system according to the present embodiment
2. Hardware configuration
3. Function and operation of information processing system
   [At start of viewing of contents]
   [At time of changing setting of audio output device]
   [At time of switching of source device]
   [At time of audio output switching to audio output device]
4. Modification of information processing system according to present embodiment
5. Operation at time of identification information exchange (at time of pairing setting
6. Supplement <1. Overall Configuration of Information Processing System According to the Present Embodiment>

First, the overall configuration of an information processing system 1 according to the present embodiment will be described.

FIG. 1 is an explanatory diagram showing the overall configuration of the information processing system 1 according to the present embodiment. As shown in FIG. 1, the information processing system 1 according to the present embodiment includes a plurality of display devices 10A to 10C, a plurality of source devices 20A and 20B, an antenna 22, and an audio output device 30. Here, the display devices 10A to 10C and the audio output device 30 configure an output device. In addition, the source devices 20A and 20B configure an information processing apparatus.

In the specification, different alphabets are denoted after the same reference number to distinguish each of the plurality of configurations having substantially the same function. However, if each of the plurality of configurations having the same function does not need to be distinguished, only the same reference number is denoted. For example, if the display devices 10A and 10B do not need to be particularly distinguished, they are simply collectively referred to as the display device 10.

The broadcast station 12 transmits program content data of television broadcasting through airwave, dedicated communication network, and the like. The television broadcasting may be a television broadcasting of an arbitrary method such as BS (Broadcast Satellite) broadcasting, CS (Communication Satellite) broadcasting, digital terrestrial broadcasting, analog terrestrial broadcasting, and cable broadcasting. The broadcast station 12 can transmit information related to the program content data (e.g., EPG: Electronic Program Guide) along with the program content data. The program content data transmitted from the broadcast station 12 is received by the antenna 22 and provided to the display device 10 and the source device 20.

The display device 10 and the source device 20 can also acquire content data from a content providing server through a network. The content data includes arbitrary data such as music data including music, lectures, and radio programs, video data including movies, television programs, video programs, photographs, documents, pictures, and graphs, games, and software.

The network may include a public line network such as Internet, telephone line network and satellite communication network, various types of LAN (Local Area Network) and WAN (Wide Area Network) including Ethernet (registered trademark), and the like. The network may also include a dedicated line network such as IP-VPN (Internet Protocol-Virtual Private Network).

Furthermore, the display device 10 and the source device 20 can also acquire the content data from an attached storage medium. The storage medium may be a storage medium such as a non-volatile memory, a magnetic disc, an optical disc, and an MO (Magneto Optical) disc. The non-volatile memory includes an EEPROM (Electrically Erasable Programmable Read-Only Memory), and an EPROM (Erasable Programmable ROM). The magnetic disc includes a hard disc and a disc-shaped magnetic body disc. The optical disc includes a CD (Compact Disc), a DVD-R (Digital Versatile Disc Recordable), and a BD (Blu-Ray Disc (registered trademark)).

The source device 20 can be connected with the display device 10 and the audio output device 30, and transmits content data (data for outputting the content, including movie data or audio data as an example) to the display device 10 or the audio output device 30 that are connected with the source device 20.

For example, in the present embodiment, the audio output device 30 is associated with the display device 10A that is used together with the audio output device 30 at a time of viewing content. At this time, the source device 20 transmits movie data of the content to the display device 10A as well as transmitting audio data of the content to the audio output device 30 associated with the display device 10A.

In order to associate the display device 10A with the audio output device 30, a pairing is set between the display device 10A and the audio output device 30, in other words, identification information (identification information unique to each device, such as device ID, or the like) are exchanged. The detail explanation on this pairing setting will be described later.

The source device 20 can acquire the content data through an arbitrary method described above. Descriptions will be hereinafter made emphasizing the example of recording the content data acquired by the source device 20 in a built-in storage medium, and transmitting the content data recorded in the storage medium.

An example in which the source device 20, the display device 10 and the audio output device 30 are wirelessly connected is shown in FIG. 1, but the present invention is not limited to such example. For example, the source device 20, the display device 10 and the audio output device 30 may be connected with a fixed line of HDMI (High-Definition Multimedia Interface), component, and the like. If the source device 20, the display device 10 and the audio output device 30 are wirelessly connected, an arbitrary wireless communication method enabling bi-directional communication can be applied.

In FIG. 1, the source device 20 such as a home video processing device or a PC (Personal Computer) is shown as one example of the information processing device, but the information processing device is not limited to such example. For example, the information processing device may be a PDA (Personal Digital Assistants), a home game device, a home electronics, a portable video processing device, a portable game device, a tuner, an input selector connected with a plurality of reproduction devices, and the like.

The display device 10 displays contents and outputs audio based on the content data transmitted from the connected source device 20. However, the display device 10 displays contents only if audio output is output from the audio output device 30. The display device 10 may be a CRT (Cathode Ray Tube) display device, a liquid crystal display (LCD) device, or an OLED (Organic Light Emitting Diode) device. Furthermore, the display device 10 may be an arbitrary information processing device similar to the source device 20.

The audio output device 30 is an output device for performing an audio output of contents based on audio data transmitted from the source device 20 that is connected therewith. This audio output device 30 is, for example, an AV amplifier, or the like.

In the information processing system 1 according to the present embodiment, each display device 10A to 10C and the audio output device 30 can connect with an arbitrary source device 20A or 20B. In FIG. 1, a state in which the display device 10A and the audio output device 30 are connected to the source device 20A, and the display device 10B is connected to the source device 20B is shown by way of example.

Here, the display device 10 has variety of GUI (Graphical User Interface), allowing a user to set the display device 10, to switch contents, to select the source 20 device to connect with, or the like, by operating on the GUI that is to be displayed on the display device 10.

On the other hand, the audio output device 30 is usually poor in its display functions comparing to the display device 10, it may be difficult to use merely the audio output device 30 to change configuration of the audio output device 30. For example, it is difficult to adjust lip-sync or to change surround mode unless it is performed while confirming movie. If the audio output device 30 is connected with the display device 10 via transmission path capable of mutual and direct communication, it may be able to change configuration of the audio output device 30 in the display device 10. However, there is no such transmission path existed in the information processing system according to the present embodiment.

The information processing system 1 according to the present embodiment has been contrived focusing on the above situation. According to the information processing system 1 of the present embodiment, even if the audio output device 30 and the display device 10 are not directly connected, configuration change of the audio output device 30 can be carried out in the display device 10. The display device 10, the source device 20 and the audio output device 30 configuring such an information processing system 1 will be described in detail below.

<2. Hardware Configuration>

Figure 2:
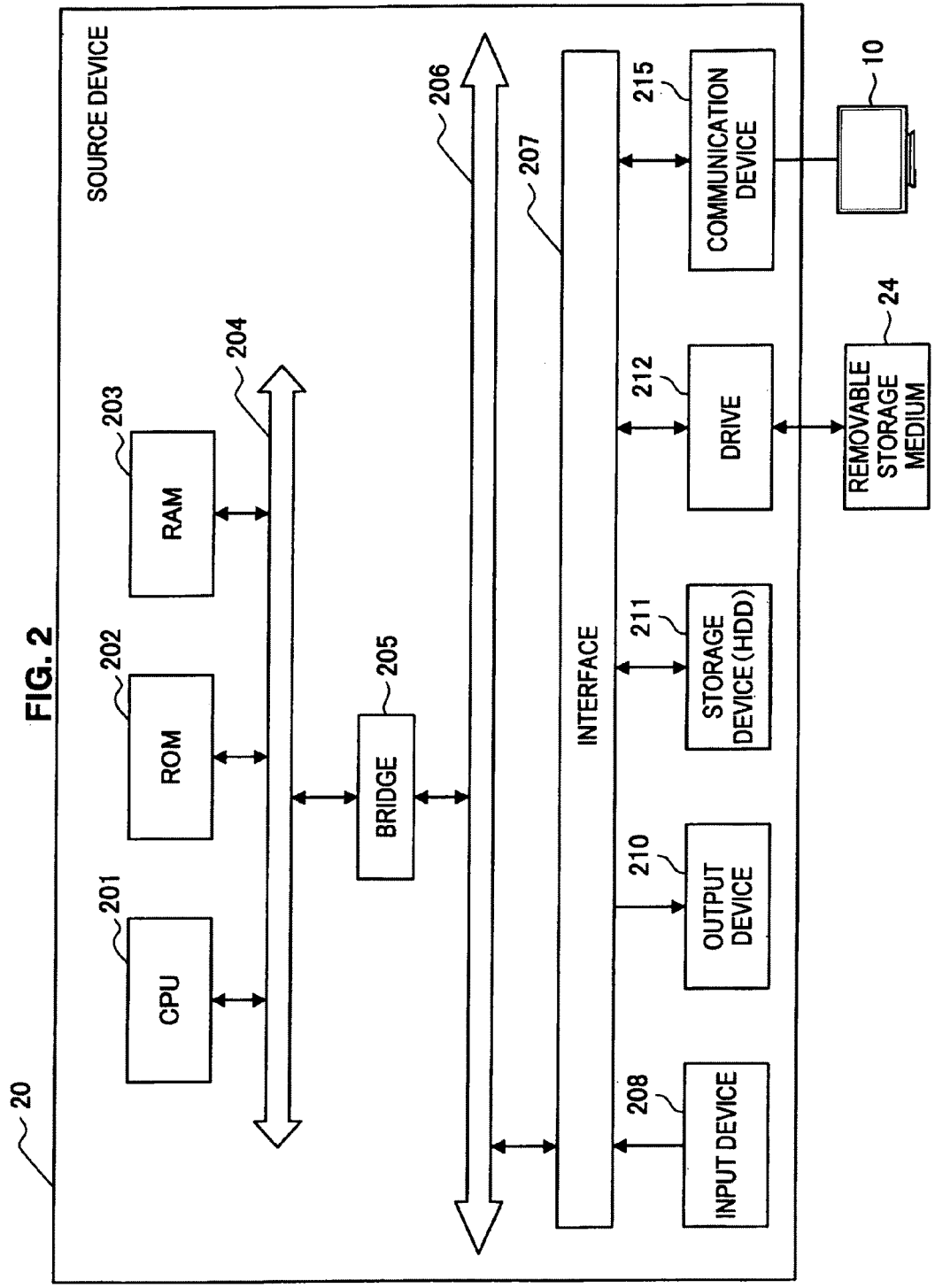
FIG. 2 is a block diagram showing a hardware configuration example of a source device according to the present embodiment.

FIG. 2 is a block diagram showing a hardware configuration of the source device 20. The source device 20 includes a CPU (Central Processing Unit) 201, a ROM (Read Only Memory) 202, a RAM (Random Access Memory) 203, and a host bus 204. The source device 20 includes a bridge 205, an external bus 206, an interface 207, an input device 208, an output device 210, a storage device (HDD) 211, a drive 212, and a communication device 215.

The CPU 201 functions as an arithmetic processing unit and a control device, and controls the entire operation of the source device 20 according to various types of programs. The CPU 201 may be a micro-processor. The ROM 202 stores programs to be used by the CPU 201, operation parameters, and the like. The RAM 203 temporarily stores programs used in the execution of the CPU 201, parameters that appropriately change in the execution, and the like. These are mutually connected by the host bus 204 configured by a CPU bus, and the like.

The host bus 204 is connected to the external bus 206 such as a PCI (Peripheral Component Interconnect/Interface) bus through the bridge 205. The host bus 204, the bridge 205, and the external bus 206 do not necessarily need to be separately configured, and the functions thereof may be mounted on one bus.

The input device 208 is configured by an input means for the user to input information, such as a mouse, a keyboard, a touch panel, a button, a microphone, a switch, or a lever, an input control circuit for generating an input signal based on the input by the user and outputting the same to the CPU 201, and the like. The user of the source device 20 can input various types of data and instruct the processing operation with respect to the source device 20 by operating the input device 208.

The output device 210 includes a display device such as a CRT (Cathode Ray Tube) display device, a liquid crystal display (LCD) device, an OLED (Organic Light Emitting Diode) device, and a lamp. The output device 210 includes an audio output device such as a speaker and a headphone. The output device 210 outputs reproduced contents. Specifically, the display device displays various types of information such as the reproduced video data in text or in images. The audio output device converts the reproduced audio data etc. to audio, and outputs the same.

The storage device 211 is a device for storing data configured as one example of a storage unit of the source device 20 according to the present embodiment. The storage device 211 may include a storage medium, a recording device for recording the data in the storage medium, a read device for reading the data from the storage medium, a deleting device for deleting the data recorded in the storage medium, and the like. The storage device 211 is configured by an HDD (Hard Disk Drive), and the like. The storage device 211 drives the hard disc, and stores the programs to be executed by the CPU 201 and various types of data. The content data are recorded in the storage device 211.

The drive 212 is a storage medium reader/writer and is incorporated in the source device 20 or is externally attached. The drive 212 reads the information recorded in an attached removable storage medium 24 such as a magnetic disc, an optical disc, a magnet-optical disc, or a semiconductor memory, and outputs the information to the RAM 203.

The communication device 215 is a communication interface configured by a communication device etc. for connecting to the display device 10 and the audio output device 30. FIG. 2 shows the display device 10 only. The communication device 215 transmits and receives movie data, audio data or various types of requests with the display device 10 and the audio output device 30. The communication device 215 can also communicate with the connected content providing server and the like through the network.

Since hardware of the audio output device 30 can be configured virtually identical to the source device 20, an explanation will be omitted.

Figure 3:
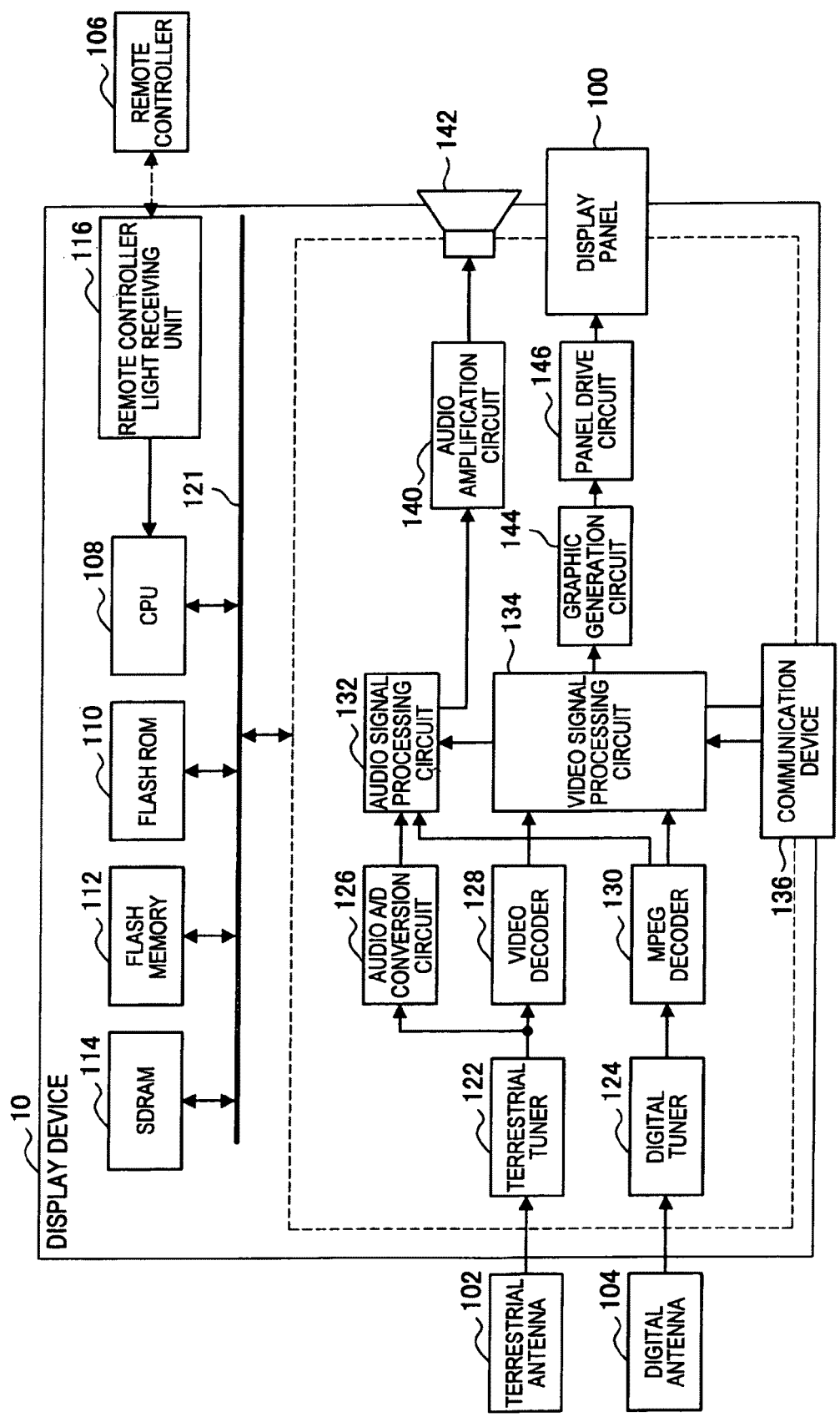
FIG. 3 is a block diagram showing a hardware configuration example of a display device according to the present embodiment.

FIG. 3 is a block diagram showing a hardware configuration of the display device 10 according to the present embodiment.

As shown in FIG. 3, the display device 10 includes a display panel 100, a CPU 108, a flash ROM 110, a flash memory 112, and an SDRAM (Synchronous Dynamic Random Access Memory) 114. The display device 10 includes a remote controller light receiving unit 116, a terrestrial tuner 122, and a digital tuner 124. The display device 10 also includes an audio A/D conversion circuit 126, a video decoder 128, an MPEG decoder 130, an audio signal processing circuit 132, and a video signal processing circuit 134. The display device 10 furthermore includes a communication device 136, an audio amplification circuit 140, a speaker 142, a graphic generation circuit 144, and a panel drive circuit 146.

The terrestrial tuner 122 receives a broadcast wave signal transmitted from a terrestrial antenna 102 for receiving analog terrestrial wave, and demodulates the video signal and the audio signal contained in the broadcast wave signal to the baseband signal. The audio signal of the baseband signal demodulated by the terrestrial tuner 122 is transmitted to the audio A/D conversion circuit 126, and the video signal is transmitted to the video decoder 128.

The digital tuner 124 receives the broadcast wave signal transmitted from the digital antenna 104 for receiving the digital broadcasting, and converts the received broadcast wave signal to MPEG2-TS (MPEG2 Transport Stream). The converted MPEG2-TS is transmitted to the MPEG decoder 130. The digital antenna 104 and the terrestrial antenna 102 correspond to the antenna 22 shown in FIG. 1.

The audio A/D conversion circuit 126 receives an analog audio signal demodulated by the terrestrial tuner 122, and converts the analog audio signal to a digital audio signal. The converted digital audio signal is then transmitted to the audio signal processing circuit 132.

The video decoder 128 receives the video signal demodulated by the terrestrial tuner 122, and converts the analog video signal to a digital component signal. The converted digital component signal is then transmitted to the video signal processing circuit 134.

The MPEG decoder 130 receives the MPEG2-TS transmitted from the digital tuner 124, and converts the MPEG2-TS to a digital audio signal for the audio and converts the MPEG2-TS to a digital component signal for the video. The converted digital audio signal is then transmitted to the audio signal processing circuit 132 and the converted digital component signal is transmitted to the video signal processing circuit 134.

The audio signal processing circuit 132 receives the digital audio signals transmitted from the audio A/D conversion circuit 126 and the MPEG decoder 130, and performs signal processing on the relevant digital audio signals. The signal processed audio signals are transmitted to the audio amplification circuit 140. The audio signal processing circuit 132 also generates an audio signal based on the audio data received from the source device 20 through the communication device 136.

The audio amplification circuit 140 receives the audio signal output from the audio signal processing circuit 132, and amplifies the same by a predetermined amount and then outputs. The amplification amount in the audio amplification circuit 140 corresponds to the volume level instructed by the user of the display device 10. The audio signal amplified by the audio amplification circuit 140 is transmitted to the speaker 142. The speaker 142 outputs audio based on the audio single transmitted from the audio amplification circuit 140.

The video signal processing circuit 134 receives the digital component signals transmitted from the video decoder 128 and the MPEG decoder 130, and performs signal processing on the digital component signals. The signal processed digital component signals are transmitted to the graphic generation circuit 144. The video signal processing circuit 134 also generates a video signal based on the video data received from the source device 20 through the communication device 136.

The communication device 136 is an interface with an external device, and has a wireless communication function with the source device 20, and the like. The communication device 136 may also include an HDMI terminal and an HDMI receiver.

The graphic generation circuit 144 generates a graphic screen (e.g., operation menu screen for extension function) that becomes necessary in the operation of the display device 10. Different graphic screens that become necessary in the operation of the display device 10 are generated depending on the operation of the user. The graphic screen generated by the graphic generation circuit 144 is superimposed with the video signal transmitted from the video signal processing circuit 134 or replaced with the video signal, and then transmitted to the panel drive circuit 146. When the graphic screen is not generated, the video signal transmitted from the video signal processing circuit 134 may be passed to the panel drive circuit 146 as it is.

The panel drive circuit 146 generates a panel drive signal that becomes necessary to display the video on the display panel 100 from the video signal transmitted from the graphic generation circuit 144. The panel drive signal generated by the panel drive circuit 146 is transmitted to the display panel 100, so that the display panel 100 operates according to the panel drive signal thereby displaying the video on the display panel 100.

The display panel 100 displays an image (moving image or still image) based on the panel drive signal transmitted from the panel drive circuit 146. The display panel 100 is configured by an LCD (Liquid Crystal Display), but may be a PDP (Plasma Display Panel), an organic EL (Electro-Luminescence) panel, and the like.

The CPU 108, the flash ROM 110, the flash memory 112, and the SDRAM 114 configure the built-in system described above. Such built-in system controls each unit of the display device 10 and also operates using the downloaded software to execute the various types of extension functions.

The CPU 108 functions as a control unit for controlling each unit of the display device 10. The CPU 108 reads a computer program stored in the flash ROM 110 and sequentially executes the same to control each configuration of the display device 10.

The flash ROM 110 stores the computer program for the CPU 108 to control each unit of the display device 10. The flash memory 112 is a freely readable/writable memory. The SDRAM 114 is a temporary work region of when the CPU 108 executes each computer program.

The remote controller light receiving unit 116 receives the signal transmitted from the remote controller 106. The signal received by the remote controller light receiving unit 116 is input to the CPU 108. The CPU 108 decodes the control code contained in the relevant signal, and controls each unit of the display device 10 so as to perform the operation corresponding to the control code (adjustment of volume level, setting of channel, display of operation menu, etc.).

Each unit of the display device 10 is mutually connected with an internal bus 121, and is configured such that the CPU 108 can control each unit of the display device 10. Furthermore, the display device 10 and the remote controller 106 may wirelessly communicate with each other. An input unit including a button, a dial, and the like for user operation may be arranged at the main body of the display device 10. In FIG. 3, an example in which the display device 10 includes the tuner and the decoder has been shown, but the display device 10 may not include the tuner or the decoder.

<3. Function and Operation of Information Processing System>

The hardware configuration of the display device 10 and the source device 20 has been described with reference to FIGS. 2 and 3. Next, the functions of the display device 10, the source device 20 and the audio output device 30, as well as the operation of the information processing system 1 will be described with reference to FIGS. 4 to 8.

Figure 4:
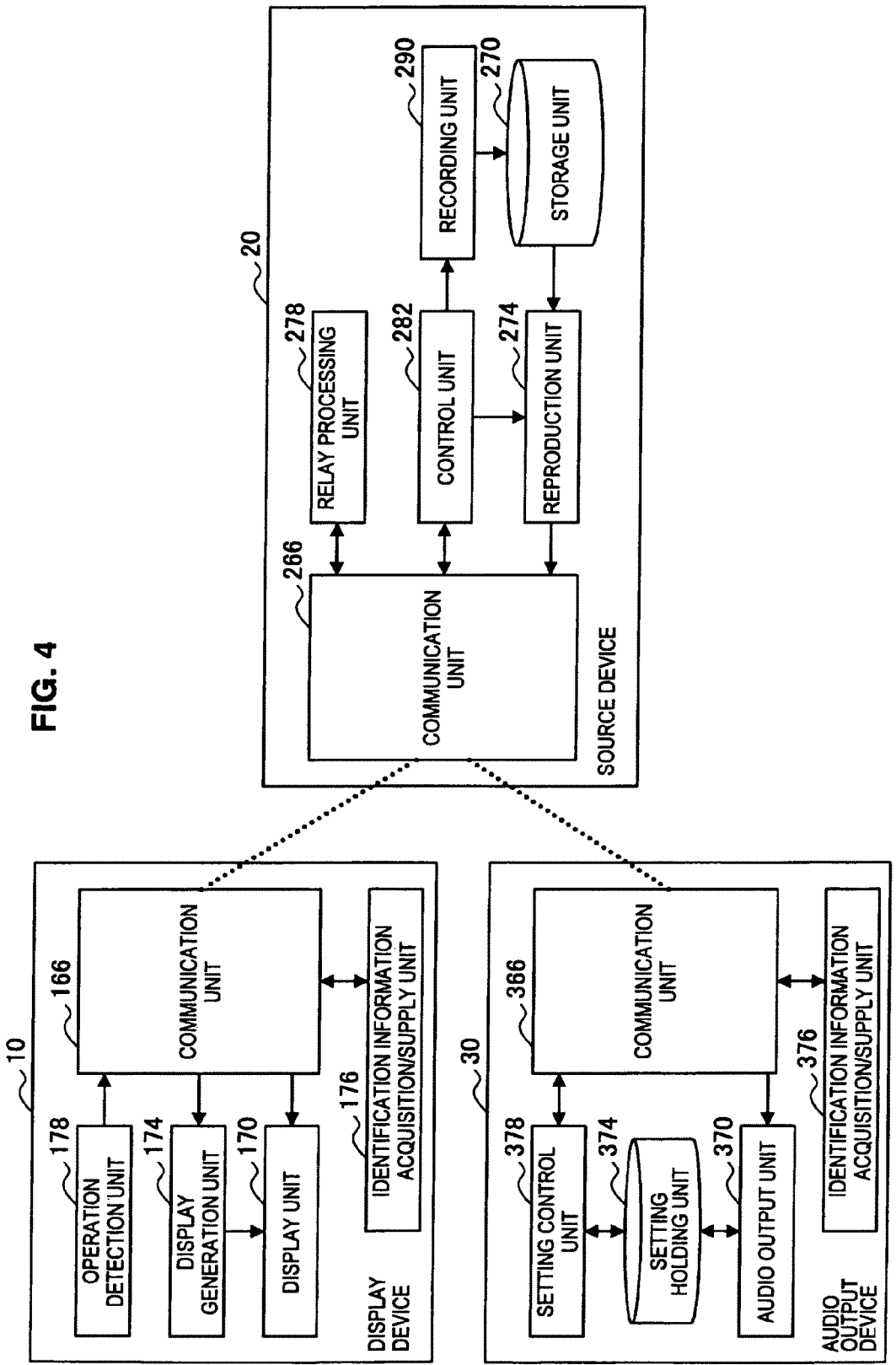
FIG. 4 is a function block diagram showing a configuration example of the display device, the source device, and the audio output device.

FIG. 4 is a function block diagram showing the configurations of the display device 10, the source device 20 and the audio output device 30 were shown. As shown in FIG. 4, the display device 10 includes a communication unit 166 (a transmission unit/a reception unit, a display unit 170, a display generation unit 174, and an operation detection unit 178. The source device 20 includes a communication unit 266, a display generation unit 174, an identification information acquisition/supply unit 176, and an operation detection unit 178.

Moreover, the source device 20 includes a communication unit 266 (a transmission unit/a reception unit), a storage unit 270, a reproduction unit 274, a relay processing unit 278, a control unit 282, and a recording unit 290. Further, the audio output device 30 includes a communication unit 366 (a transmission unit/a reception unit), an audio output unit 370, a setting holding unit 374, an identification information acquisition/supply unit 376, and a setting control unit 378.

The communication unit 266 of the source device 20 is an interface with the display device 10 and the audio output device 30, and performs transmission of movie data and status to the display device 10, transmission of audio data to the audio output device 30, reception of various requests from the display device 10, and the like. The communication unit 266 is, for example, realized when the CPU 201 controls the communication device 215 shown in FIG. 2.

Further, the communication unit 266 also performs authentication of the display device 10 and the audio output device 30, and a connection establishing processing such as key exchange with the display device 10. For example, when received a connection request form the display device 10, the communication unit 266 performs the connection establishing processing with the display device 10 as well as the connection establishing processing with the audio output device 30 that is associated with the display device 10. The display device 10 registers identification information of the corresponding audio output device 30, such as network address, device ID, or the like, and the display device 10 may transmit the identification information of the corresponding audio output device 30 as well as the connection request. Or the identification information of the display device 10 and the audio output device 30 may be registered in the source device 20 in association with each other.

The content data (including movie data and audio data) is recorded in the storage unit 270. For example, the content data acquired through an arbitrary method described in "1. Overall configuration of information processing system according to the present embodiment" is recorded in the storage unit 270 by the recording unit 290. Such storage unit 270 may be a storage medium such as a non-volatile memory, a magnetic disc, an optical disc, or an MO disc.

The reproduction unit 274 reads the content data stored in the storage unit 270 based on the control by the control unit 282. The reproduction unit 274 may decode the content data read from the storage unit 270, as necessary. In this specification, the process including the read of the content data is referred to as reproduction for the sake of convenience of explanation.

Among the content data reproduced by the reproduction unit 274, movie data and audio data are transmitted to the display device 10 connected to the source device 20. The audio data is transmitted to the audio output device 30 connected to the source device 20. If a plurality of display devices 10 is connected to the source device 20, the movie data and the audio data reproduced by the reproduction unit 274 is transmitted by multicast.

The control unit 282 controls the entire operation of the source device 20. For example, when received an arbitrary request from the display device 10, the control unit 282 performs a response control to the request. The arbitrary request includes requests regarding reproduction processing, for example, fast forward, rewind, pause, chapter switching, and changing of reproduction content, etc.

When the connections of the communication unit 266 with all the display devices 10 and the audio output device 30 are disconnected, the control unit 282 stops the reproduction of contents by the reproduction unit 274. According to such configuration, the display device 10 of the user starting to newly view the content can freely access the source device 20. Furthermore, the power consumption can be reduced.

When instructed to record the content data by the control unit 282, the recording unit 290 records the content data acquired through an arbitrary method in the storage unit 270. For example, the recording unit 290 may record the program content data acquired from the broadcast station 12, the content data acquired from the content providing server through the network, and the content data acquired from the attached optical disc in the storage unit 270.

The relay processing unit 278 relays communication between the display device 10 and the audio output device 30. For example, the relay processing unit 278 transmits information (message) transmitted from the display device 10 to the audio output device 30 via the communication unit 266, and transmits information (message) transmitted from the audio output device 30 to the display device 10 via the communication unit 266.

The communication unit 166 of the display device 10 is an interface with the source device 20, and functions as a reception unit and a transmission unit that perform reception of movie data, audio data and status from the source device 20, transmission of various types of requests to the source device 20, and the like. The communication unit 166 also performs authentication with the source device 20, and a connection establishing process such as key exchange with the source device 20. If the movie data and audio data received from the source device 20 are encrypted, the communication unit 166 decrypts the movie data and audio data using the key acquired by the key exchange. The communication unit 166 is realized when the CPU 108 controls the communication device 136 shown in FIG. 3.

The display unit 170 (an output unit) displays the movie data received from the source device 20 by the communication unit 166 and the display screen generated by the display generation unit 174. The display unit 170 corresponds to the panel drive unit 146 and the display panel 100 shown in FIG. 3. If the movie data received from the source device 20 is encoded, the display unit 170 also decodes the movie data.

The display generation unit 174 generates various types of display screens based on information transmitted from the source device 20. The display screens includes, for example, a selection screen of connecting devices shown in FIG. 6, an adjustment screen of lip-sync shown in FIG. 8, or the like. The display generation unit 174 corresponds to the graphic generation circuit 144 shown in FIG. 3.

The operation detection unit 178 detects the user operation with respect to the display device 10. The operation detection unit 178 corresponds to the remote controller light receiving unit 116 shown in FIG. 3, and detects the user operation in the remote controller 106. The user operation includes operation indicating the request related to the reproduction process of the content, operation related to the configuration change of the audio output device 30, operation related to switching of the source device 20, operation related to switching to audio output from the audio output device 30, operation related to pairing setting, and the like.

The identification information acquisition/supply unit 176 performs exchange of identification information, that is paring setting, with the audio output device 30 via the source device 20 when associating with the audio output device 30. This identification information acquisition/supply unit 176 complies with the CPU 108 shown in FIG. 3. The identification information acquisition/supply unit 176 performs paring setting in cooperation with the identification information acquisition/supply unit 376 of the audio output device 30. The identification information acquisition/supply unit 176 obtains identification information of the audio output device 30 from the audio output device 30 to supply its own identification information to the audio output device 30 at the time of paring setting.

The identification information that is exchanged here is identification information unique to devices, such as device ID, or the like. Identification information actually used for transmitting/receiving messages may be identification information itself that is exchanged at the time of paring setting as mentioned above, or may be network address, such as logical address that has been obtained subsequently using the exchanged identification information. This logical address or the like configures other identification information corresponding to the exchanged identification information.

Note that FIG. 4 omits an illustration of the audio output unit that outputs audio of audio data received from the source device 20 by the communication unit 166.

The communication unit 366 of the audio output device 30 is an interface with the source device 20, and functions as a reception unit and a transmission that perform reception of audio data from the source device 20, transmission of various types of information to the source device 20, and the like. The communication unit 366 also performs authentication with the source device 20, and a connection establishing process such as key exchange with the source device 20. If the audio data received from the source device 20 is encrypted, the communication unit 366 decrypts the audio data using the key acquired by the key exchange.

The audio output unit 370 (an output unit) outputs audio data received from the source device 20 by the communication unit 366 as audio. For example, the audio output unit 370 may be a speaker, an earphone, a head phone, or the like.

The setting holding unit 374 holds setting information such as parameters configurable to the audio output device 30 and current values of each parameter, or the like. An example of the parameters configurable to the audio output device 30, configurable values of each parameter, configuration range, and default will be described below.

TABLE 1

| Menu | Item | Configurable Value | Range | Default |
|---|---|---|---|---|
| Sur Setting | Sur Back Decode | OFF, AUTO, ON | — | AUTO |
| | Sur Back Dec Mode | DDEX, PLIIx MV, PLIIxMS | — | PLIIx MV |
| | Effect Level | 20%-120% | 5% | 100% |
| | Center Width | 0-7 | 1 | 3 |
| | Dimension | Front +3-0, Sur +3 | 1 | 0 |

TABLE 1-continued

| Menu | Item | Configurable Value | Range | Default |
|---|---|---|---|---|
| | Panorama Mode | OFF, ON | — | OFF |
| | Screen Depth | OFF, ON | — | ON |
| | VIR. Speakers | OFF, ON | — | ON |
| | Front Reverb | Wet, Std | — | Std |
| Audio Setting | AV SYNC | 0 ms-300 ms | 10 ms | 0 ms |
| | Dual Mono | MAIN/SUB, MAIN, MAIN + SUB | — | MAIN |
| | DEC PRIORITY | PCM, AUTO | — | AUTO |
| EQ Setting | EQ Preset | OFF, 1, 2, 3, 4, 5 | — | 1 |
| | Front Bass | −10 dB-+10 dB | 1 dB | 0 dB |
| | Front Treble | −10 dB-+10 dB | 1 dB | 0 dB |
| | Center Bass | −10 dB-+10 dB | 1 dB | 0 dB |
| | Center Treble | −10 dB-+10 dB | 1 dB | 0 dB |
| | Sur/SB Bass | −10 dB-+10 dB | 1 dB | 0 dB |
| | Sur/SB Treble | −10 dB-+10 dB | 1 dB | 0 dB |
| | Preset clear | Yes, No | — | No |
| Source Switching | | Source 1, 2, 3, 4 | — | Source1 |
| Volume Adjustment | | −∞-0 dB | 1 dB | — |

The setting control unit 378 has a function as configuration change unit for changing configuration of arbitrary parameter of the audio output device 30. Function of the setting control unit 378 will be specifically explained with reference to FIG. 7 and FIG. 8.

The identification information acquisition/supply unit 376 performs exchange of identification information, that is pairing setting, with the display device 10 via the source device 20 when associating with the display device 10. At the time of paring setting, the identification information acquisition/supply unit 376 obtains identification information of the display device 10 and supplies own identification information to the display device 10. This identification information acquisition/supply unit 376 performs paring setting in cooperation with the identification information acquisition/supply unit 176 of the display device 10.

A specific operation of the information processing system 1 according to the present embodiment including the display device 10 and the source device 20 and the audio output device 30 will be hereinafter described in the order of at the start of viewing of contents, at the time of switching of the source device, and at the time of at time of audio output switching to audio output device.

[At Start of Viewing of Contents]

The display device 10 acquires the status of each source devices 20 (20A, 20B), and performs a connection with the source device 20 selected by the user. The operation at the start of viewing of contents in the display device 10A will be hereinafter specifically described with reference to FIGS. 5 and 6.

Figure 5:
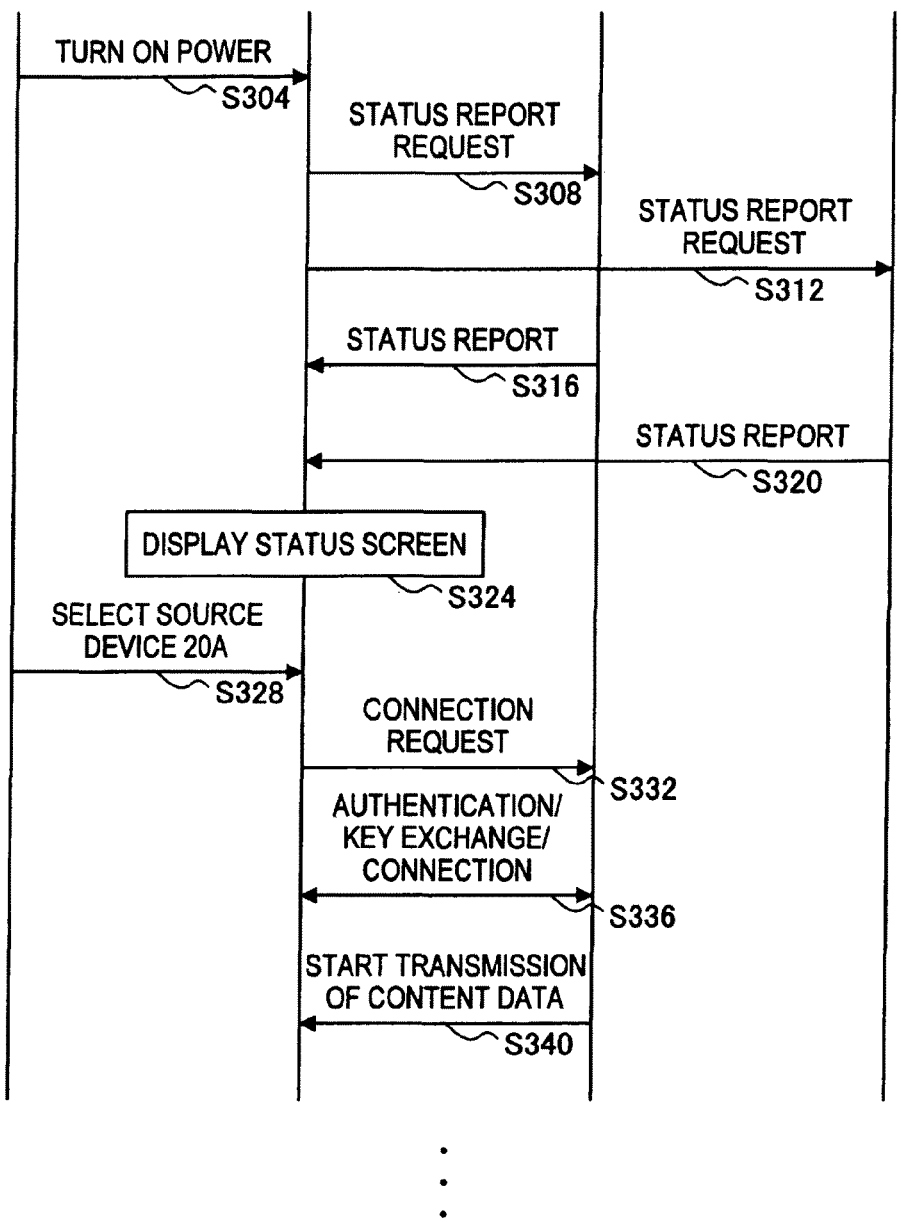
FIG. 5 is a sequence chart showing the flow of the operation at the start of viewing of the content in the information processing system according to the present embodiment.

FIG. 5 is a sequence chart showing the flow of operation at the start of viewing of content in the information processing system 1 according to the present embodiment. As shown in FIG. 5, when the power supply of the display device 10A is first turned ON by the user (S304), the communication unit 166 of the display device 10A transmits a status report request to the source device 20A and the source device 20B (S308, S312).

The status includes reproducing, stop, power OFF, title of content being reproduced, title of content being stored, presence of exclusive state, and the like. The source device 20A and the source device 20B report the status to the display device 10A in response to the request from the display device 10A (S316, S320).

In FIG. 5, an example of acquiring the status of the source device 20 when requested by the display device 10A is shown, but the present invention is not limited to such example. For example, the source device 20 may periodically transmit the status, or may transmit at the time of change (e.g., at the time of change of the reproduction content).

When receiving the status reports from the source device 20A and the source device 20B, the display generation unit 174 of the display device 10A generates a status screen showing the statuses of the source device 20A and the source device 20B, and causes the display unit 170 to display the status screen (S324).

Figure 6:
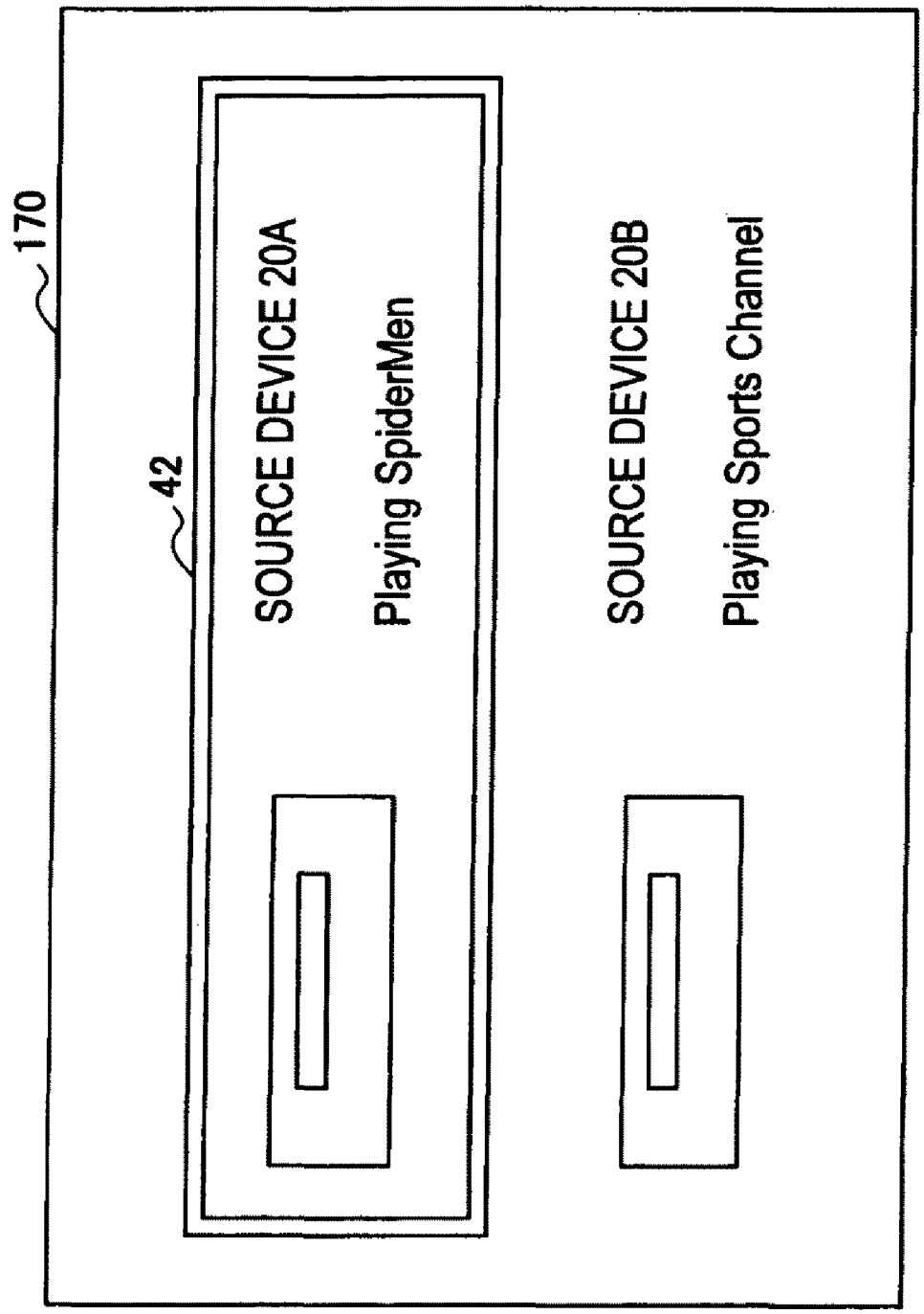
FIG. 6 is an explanatory view showing a specific example of a status screen of the source device.

FIG. 6 is an explanatory diagram showing a specific example of the status screen of the source device 20. As shown in FIG. 6, the status screen includes the name of the source device and the title of the content being reproduced. The user can operate the remote controller 106 to move the cursor 42 and select the source device 20A or the source device 20B in the status screen. If the reproduction of the content is not performed in the source device 20, the display device 10 displays "No Playing", "Power Off", etc. to notify that the user can execute the reproduction and startup of the source device 20.

When the user selects the source device 20A in the status screen (S328), the display device 10A transmits a connection request to the source device 20A (S332). Subsequently, the communication unit 166 of the display device 10 and the communication unit 266 of the source device 20 carry out the authentication process and the key exchange (S336) to be mutually connected (S340).

The communication unit 166 of the source device 20 performs authentication processing and key exchange with the audio output device 30 associated with the audio output device 30 associated with the display device 10A that is a source of a connection request, and is to be connected mutually with the audio output device 30. Thus, when the source device 20 makes a connection with the audio output device 30 that is associated with the display device 10A, authentication processing and key exchange will be automatically performed without user actions by using identification information (such as logical address, etc.) of the audio output device 30 which is supplied by, for example, the display device 10A.

Subsequently, the source device 20A transmits video data of content currently producing to the display device 10A by multicast, and transmits audio data to the audio output device 30 (S340). As a result, video of the content will be displayed on the display unit 170 of the display device 10A, and audio of the content is to be output from the audio output unit 370 of the audio output device 30.

Thus, according to the present embodiment, the enhancement in the user convenience is expected since the user can select the source device 20 to connect after grasping the content being reproduced in each source device 20 at the start of viewing of the contents.

[At Time of Changing Setting of Audio Output Device]

The operation of the information processing system 1 at the time of changing the setting of the audio output device 30 will now be described with reference to FIGS. 7 and 8.

Figure 7:
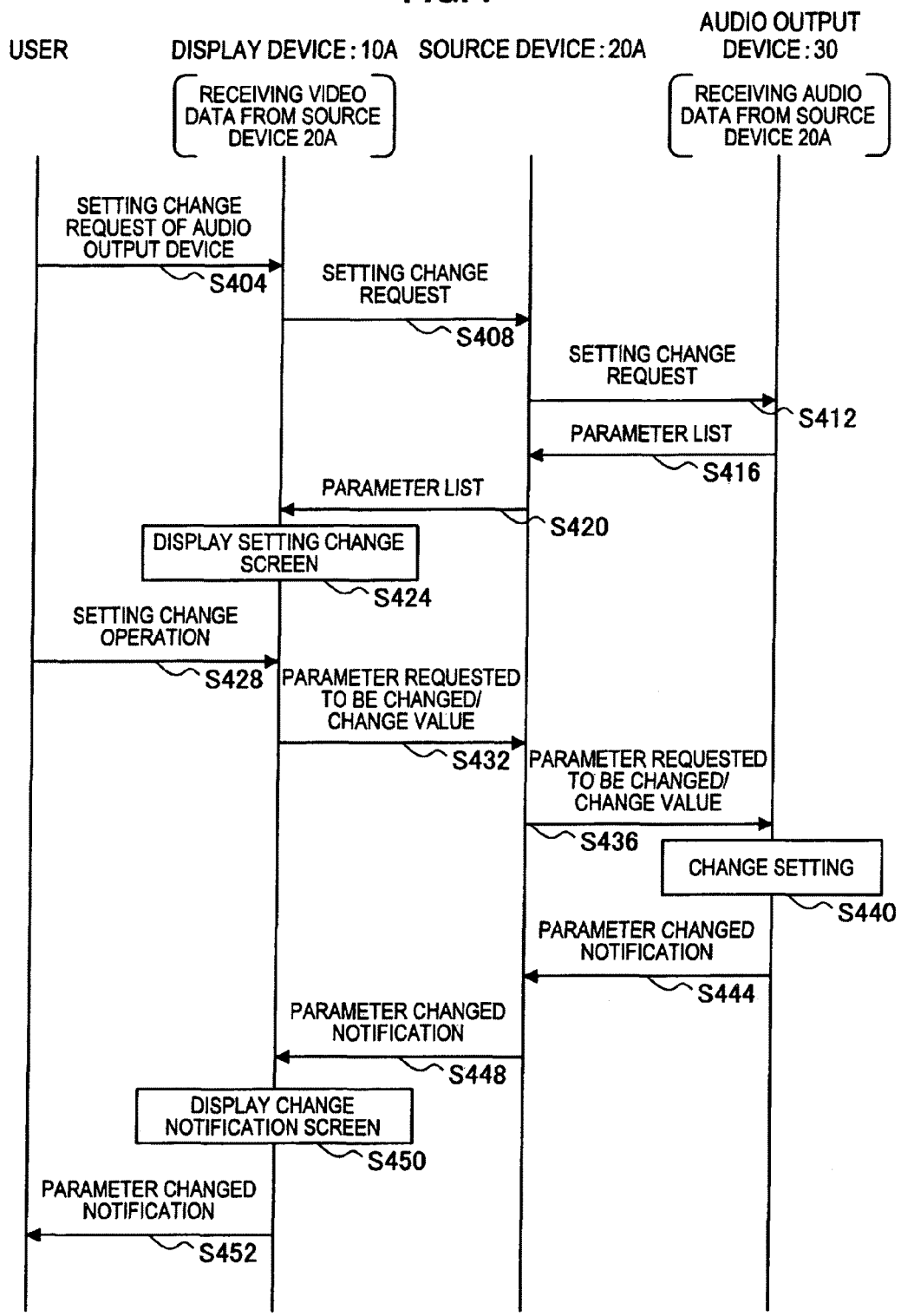
FIG. 7 is a sequence chart showing the flow of the operation at the time of changing the setting of the audio output device in the information processing system according to the present embodiment.

FIG. 7 is a sequence chart showing the flow of the operation at the time of changing the setting of the audio output device 30 in the information processing system 1 according to the present embodiment. In FIG. 7, assume that the source device 20A is transmitting the video data of a predetermined content to the display device 10A and transmitting the audio data of a predetermined content to the audio output device 30.

First, as shown in FIG. 7, when the operation requesting to change the setting of the audio output device 30 by the user is detected by the operation detection unit 178 of the display device 10A (S404), the communication unit 166 requests the source device 20A to relay the setting change request to the audio output device 30 (S408). The relay processing unit 278 of the source device 20A relays the setting change request to the audio output device 30 (S412). The display device 10A is registered with identification information (device ID, logical address etc.) of the corresponding audio output device 30.

The setting change request from the communication unit 166 to the source device 20A includes the identification information of the display device 10A, the identification information of the source device 20A, and the identification information of the audio output device 30. The setting change request from the source device 20A to the audio output device 30 includes the identification information of the source device 20A and the identification information of the audio output device 30. The identification information in this case is the logical address and the like in which the data amount is small.

The description will be hereinafter omitted, but the identification information of each device is similarly contained in the information transmitted from the display device 10A to the audio output device 30 through the source device 20A, and also in the information transmitted from the audio output device 30 to the display device 10A through the source device 20A.

Upon receiving the setting change request from the communication unit 366, the setting control unit 378 of the audio output device 30 reads the setting information such as the parameter list, which is a list of parameters that can be set, the current value, and the like from the setting holding unit 374. The communication unit 366 requests the source device 20 to relay the parameter list and the like read by the setting control unit 378 to the display device 10A (S416). The audio output device 30 is registered with identification information (device ID, logical address etc.) of the corresponding display device 10A.

When the parameter list and the like are received by the communication unit 166 by the relay of the source device 20A (S420), the display generation unit 174 generates a setting change screen of the audio output device 30 based on the relevant parameter list and causes the display unit 170 to display the same (S424). More specifically, the display generation unit 174 generates a list screen showing the parameters that can be set in the audio output device 30 contained in the parameter list, and when a specific parameter, for example, the parameter involved in the audio reproduction (audio output) of the audio output device 30 such as lip-sync and reproduction mode is selected by the user, and then generates the setting change screen of the parameter. The setting change screen of the lip-sync is shown in FIG. 8 by way of example.

Figure 8:
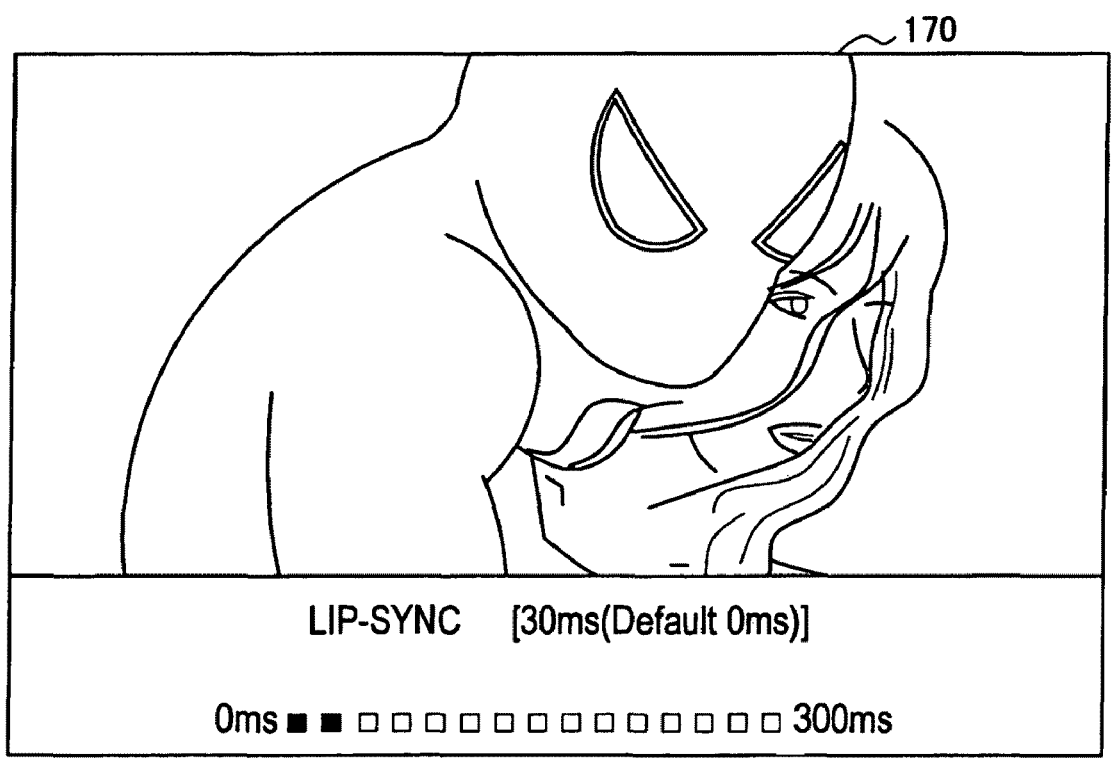
FIG. 8 is an explanatory view showing a specific example of the setting change screen of the lip-sync.

FIG. 8 is an explanatory view showing a specific example of the setting change screen of the lip-sync. According to the present embodiment, the user can change (adjust) the setting of the lip-sync while checking the setting change screen displayed on the display unit 170 of the display device 10, as shown in FIG. 8. Therefore, the user can more appropriately change the setting of the parameter such as the lip-sync. The lip-sync is a parameter for synchronizing the display timing of the video and the output timing of the audio.

When the setting change operation in the setting change screen is detected by the operation detection unit 178 (S428), the communication unit 166 requests the source device 20 to relay the parameter requested to be changed and the value after the change of the relevant parameter to the audio output device 30 (S432). The relay processing unit 278 of the source device 20A then relays the parameter requested to be changed and the value after the change of the relevant parameter to the audio output device 30 (S436).

Furthermore, the setting control unit 378 of the audio output device 30 changes the setting of the parameter based on the parameter and the value after the change of the parameter relayed by the source device 20 (S440). Thereafter, the communication unit 366 of the audio output device 30 requests the source device 20A to relay the parameter change notification indicating that the changing of the parameter is finished to the display device 10A (S444), and the source device 20A relays the parameter change notification (S448).

When the parameter change notification is received by the communication unit 166 of the display device 10, the display generation unit 174 displays a display screen indicating that the changing of the parameter is finished and causes the display unit 170 to display the same (S450). The user is thereby notified that that changing of the parameter is finished (S452).

As described above, according to the information processing system 1 of the present embodiment, the display device 10 displays the setting change screen of the audio output device 30 by the relaying process of the source device 20, and hence the user can change the setting at the relevant setting change screen. Therefore, the user can appropriately change the setting of the parameter such as the lip-sync even if the display device 10 and the audio output device 30 are not bi-directionally connected directly with a communicable transmission path.

[At Time of Switching of Source Device]

The operation of the information processing system 1 at the time of switching of the source device 20 will now be described with reference to FIG. 9.

Figure 9:
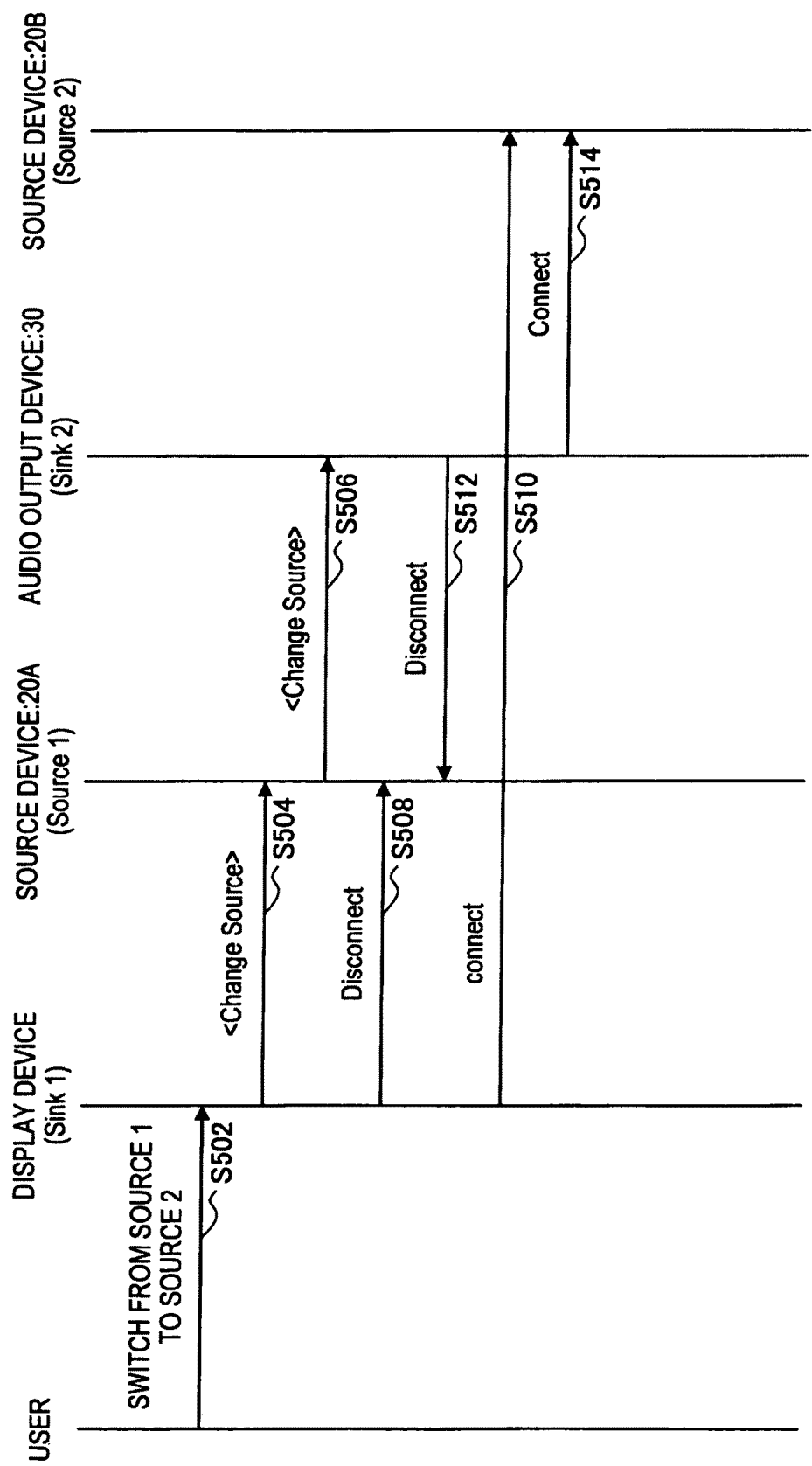
FIG. 9 is a sequence chart showing the flow of the operation at the time of switching of the source device in the information processing system according to the present embodiment.

FIG. 9 is a sequence chart showing the flow of the operation at the time of switching of the source device 20 in the information processing system 1 according to the present embodiment. In FIG. 9, assume that the display device 10A and the audio output device 30, which are corresponded to each other, are first connected to the source device 20A. The display device 10A is registered with the identification information (device ID, logical address, etc.) of the corresponding audio output device 30. The audio output device 30 is registered with the identification information (device ID, logical address, etc.) of the corresponding display device 10A.

First, as shown in FIG. 9, when the operation requesting to switch from the source device 20A (source 1) to the source device 20B (source 2) by the user is detected by the operation detection unit 178 of the display device 10A (S502), the communication unit 166 of the display device 10A transmits an input switch command <Change Source> of (1) to the source device 20A and requests for a relay (S504).

<Change Source><Sink1 address><Source1 address><Sink2 address><Source2 address>  (1)

In the input switch command <Change Source>, <Change Source> indicates that it is the command for notifying the input source switch to the sink of the destination. In the input switch command <Change Source>, <Sink1 address> represents the address of the command issuing source (display device 10A), <Source1 address> represents the address of the destination (source device 20A) of the command, <Sink2 address> represents the address of the command target sink (audio output device 30), and <Source2 address> represents the address of the source device (source device 20B), which is the new connecting destination instructed by the user.

The relay processing unit 278 of the source device 20A that has received the input switch command <Change Source> of (1) transmits an input switch command <Change Source> of (2) to the audio output device 30 or the command target sink for relay (S506).

<Change Source><Source1 address><Sink2 address><Source2 address>  (2)

In the input switch command <Change Source>, <Change Source> indicates that it is the command for notifying the input source switch to the sink of the destination. In the input switch command <Change Source>, <Source1 address> represents the address of the command issuing source (source device 20A), <Sink2 address> represents the address of the destination (audio output device 30) of the command, and <Source2 address> represents the address of the source device (source device 20B), which is the new connecting destination instructed by the user.

The input switch commands <Change Source> of (1) and (2) may be the same commands but have two forms, relay requesting command and relaying command, respectively depending on the number of operands. The relay requesting command and the relaying command may be respectively defined in different commands or a command requesting for the relay of the command may be defined. An Acknowledge command for confirming the reception of the command may be respectively defined. Furthermore, an error message such as <Feature Abort> replying that the relevant command is not supported may be defined.

The display device 10A disconnects the connection with the source device 20A (S508) after transmitting the input switch command <Change Source> of (1) to the source device 20A. The display device 10A also transmits a connection request to the source device 20B and performs the authentication process and the key exchange with the source device 20B so as to be connected to the source device 20B (S510).

The audio output device 30 disconnects the connection with the source device 20A (S512) after receiving the input switch command <Change Source> of (2) from the source device 20A. The audio output device 30 then transmits a connection request to the source device 20B and performs the authentication process and the key exchange with the source device 20B so as to be connected to the source device 20B (S514).

As described above, according to the information processing system 1 of the present embodiment, the input switch command <Change Source> is transmitted from the display device 10A to the audio output device 30 corresponded with the display device 10A by the relaying process of the source device 20. The user thus can smoothly carry out the input source switching of both the display device 10A and the audio output device 30 by simply performing the input switching operation with respect to the display device 10A.

[At Time of Audio Output Switching to Audio Output Device]

The operation of the information processing system 1 at the time of audio output switching to the audio output device 30 will now be described with reference to FIG. 10.

Figure 10:
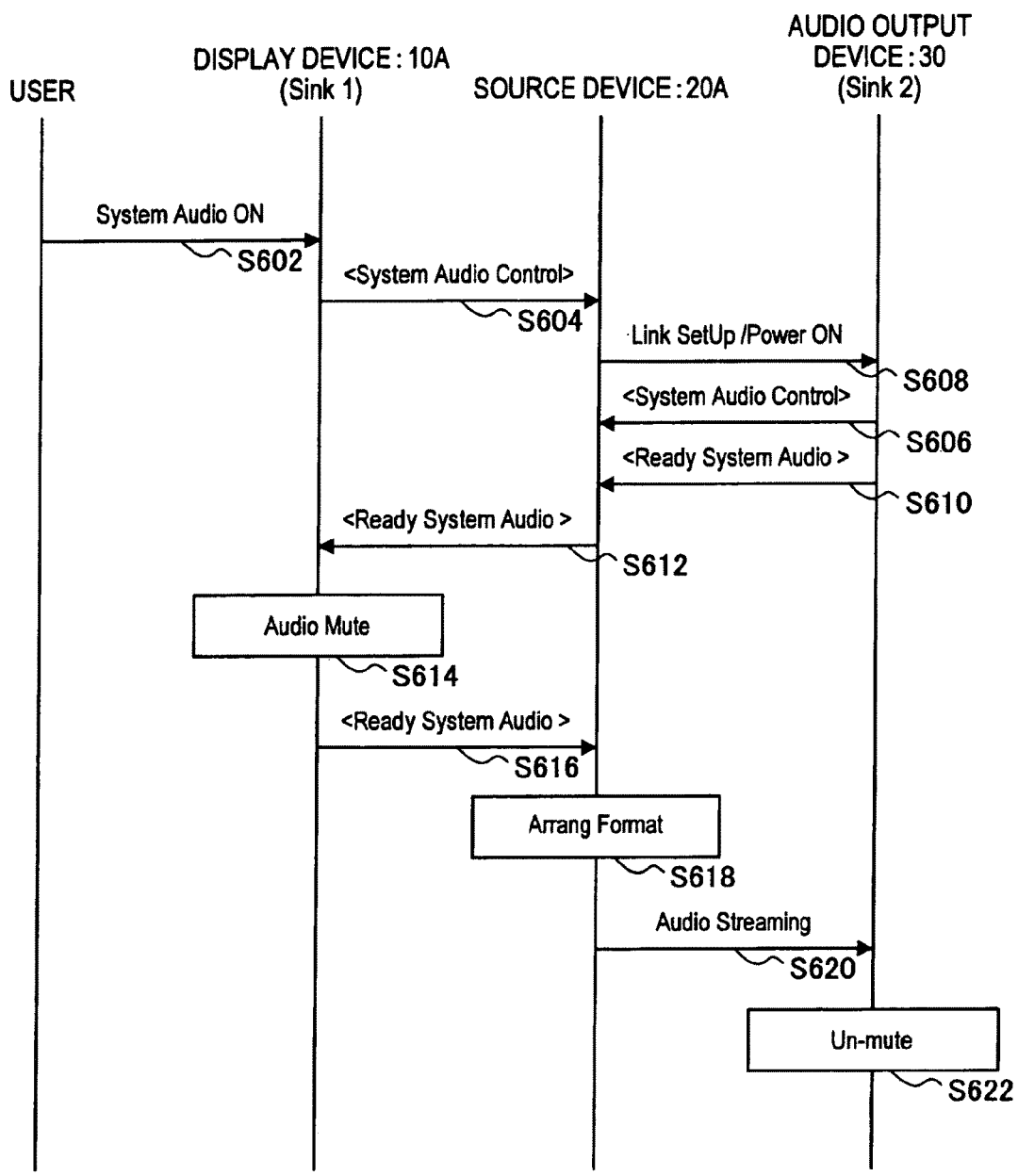
FIG. 10 is a sequence chart showing the flow of the operation at the time of audio output switching to the audio output device in the information processing system according to the present embodiment.

FIG. 10 is a sequence chart showing the flow of operation at the time of switching of the source device 20 in the information processing system 1 according to the present embodiment. In FIG. 10, assume that the display device 10A is connected to the source device 20A, and the source device 20A is transmitting the video data and the audio data of a predetermined content to the display device 10A. The display device 10A is registered with the identification information (device ID, logical address, etc.) of the corresponding audio output device 30. The audio output device 30 is registered with the identification information (device ID, logical address, etc.) of the corresponding display device 10A.

First, as shown in FIG. 10, when the operation (System Audio ON) requesting the audio output switch to the audio output device 30 side by the user is detected by the operation detection unit 178 of the display device 10A (S602), the communication unit 166 of the display device 10A transmits a command <System Audio Control> of (3) to the source device 20A and requests for a relay (S604).

<System Audio Control>[On]<Sink1 address><Source address><Sink2 address>      (3)

In the command <System Audio Control>, <System Audio Control> indicates that it is the command for controlling the audio output on the audio output device 30 side. Furthermore, in the command <System Audio Control>, [On] represents the request of transition from Off to On. [Off] represents the request of transition from On to Off. In the command <System Audio Control>, <Sink1 Address> represents the address (identification information) of the command issuing source (display device 10A), <Source address> represents the address of the destination (source device 20A) of the command, and <Sink2 address> represents the address of the command target sink (audio output device 30).

The relay processing unit 278 of the source device 20A that has received the command <System Audio Control> of (3) transmits a command <System Audio Control> of (4) to the audio output device 30 or the command target sink for relay (S606).

<System Audio Control>[On]<Source address><Sink address>      (4)

In the command <System Audio Control>, <System Audio Control> indicates that it is the command for controlling the audio output on the audio output device 30 side. Furthermore, in the command <System Audio Control>, [On] represents the request of transition from Off to On. In the command <System Audio Control>, <Source address> represents the address of the destination (source device 20A) of the command, and <Sink2 address> represents the address of the destination (audio output device 30) of the command.

The source device 20A shifts the audio output device 30 from the standby state to the power ON state and carries out the connection if necessary (S608), and then transmits the command <System Audio Control>.

After receiving the command <System Audio Control> of (4) from the source device 20A, the audio output device 30 transmits a message <Ready System Audio> of (5) to the source device 20A to inform that the own device can process the relevant command (S610).

<Ready System Audio><Sink2 address><Source address>      (5)

In the message <Ready System Audio>, the <Ready System Audio> indicates that it is a message for informing that <System Audio Control> command can be processed. In the message <Ready System Audio>. <Sink2 address> represents the address of the issuing source (audio output device 30) of the message, and <Source address> represents the address of the destination (source device 20A) of the message.

If not supporting <System Audio Control> command, the audio output device 30 transmits an error message such as <Feature Abort> to the source device 20A instead of the message <Ready System Audio> of (5).

When receiving the message <Ready System Audio> of (5) from the audio output device 30, the relay processing unit 278 of the source device 20A transmits a message <Ready System Audio> of (6) to the display device 10A for relay (S612). The source device 20A notifies that the audio output device 30A is ready by transmitting the message <Ready System Audio> to the display device 10A.

<Ready System Audio><Source address><Sink1 address>      (6)

In the message <Ready System Audio>, <Ready System Audio> indicates that it is a message for notifying that the audio output device 30 side is ready. In the message <Ready System Audio>, <Source address> represents the address of the issuing source (source device 20A) of the message, and <Sink1 address> represents the address of the destination (display device 10A) of the message.

When receiving the error message such as <Feature Abort> from the audio output device 30, or when a response from the audio output device 30 is not made for a certain time, the source device 20A determines that the audio output device 30 side does not support the cooperative operation with the display device 10A. The source device 20A then transmits the error message such as <Feature Abort> to the display device 10A to notify the same. When receiving the error message such as <Feature Abort> from the source device 20A, the display device 10 may display such notification on the display unit 170 to inform the user that the relevant function is not supported in the system.

When receiving the message <Ready System Audio> from the source device 20A, the display device 10A mutes the audio output from the audio output unit such as the speaker (S614). The display device 10A then transmits a message <Ready System Audio> of (7) to the source device 20A to notify that the display device 10 side is also ready.

<Ready System Audio><Sink1 address><Source address>      (7)

In the message <Ready System Audio>,<Ready System Audio> indicates that it is a message for notifying that the display device 10A side is ready. In the message <Ready System Audio>, <Sink1 address> represents the address of the issuing source (display device 10A) of the message, and <Source address> represents the address of the destination (source device 20A) of the message. The display device 10A ignores the audio data of the content even if received from the source device 20A after issuing the message <Ready System Audio> of (7) with respect to the source device 20A.

When receiving the message <Ready System Audio> from the display device 10A, the source device 20A determines the audio format of the content to transmit according to the performance of the audio output device 30 (S618), and the source device 20A transmits the audio data of the content to the audio output device 30 (S620). The audio output device 30 releases the mute state and outputs the audio by the audio data transmitted from the source device 20A (S622).

As described above, according to the information processing system 1 of the present embodiment, the command <System Audio Control> is transmitted from the display device 10A to the audio output device 30 corresponded to the relevant display device 10A by the relaying process of the source device 20. Thus, the user can carry out the audio output switch to the audio output device 30 by simply performing the audio output switching operation to the audio output device 30 side with respect to the display device 10A. Thus, the content can be viewed and listened at high quality audio by performing the audio output switch to the audio output device 30 side.

The detailed description will be omitted, but the operation of increasing/decreasing the volume of the audio output device 30 can be carried out from the display device 10A side by transmitting a command <User Control Pressed> of (8) from the display device 10A to the source device 20A according to the operation requesting to increase/decrease the volume of the user.

<User Control Pressed>[Vol. Up|Vol. Down]<Sink1 address><Source address><Sink2 address> (8)

In the command <User Control Pressed>, <User Control Pressed> indicates that it is the command for controlling increase/decrease of the volume on the audio output device 30 side. In the command <User Control Pressed>, [Vol.Up|Vol. Down] represents the request to increase/decrease the volume. Furthermore, in the command <User Control Pressed>, <Sink1 Address> represents the address of the command issuing source (display device 10A), <Source address> represents the address of the destination (source device 20A) of the command, and <Sink2 address> represents the address of the command target sink (audio output device 30).

As described above, if the display device 10A and the audio output device 30, which are corresponded to each other, acquire the respective identification information (device ID, logical address corresponding to relevant device ID, etc.) in advance, information can be exchanged as if they were directly connected to each other so that the cooperative operation requested by the user can be carried out.

<4. Modification of Information Processing System According to Present Embodiment>

An example in which the display device 10 and the audio output device 30 perform an output based on the video data and the audio data transmitted from the source device 20 has been described, but the present invention is not limited to such example as will be described below with reference to FIG. 11.

Figure 11:
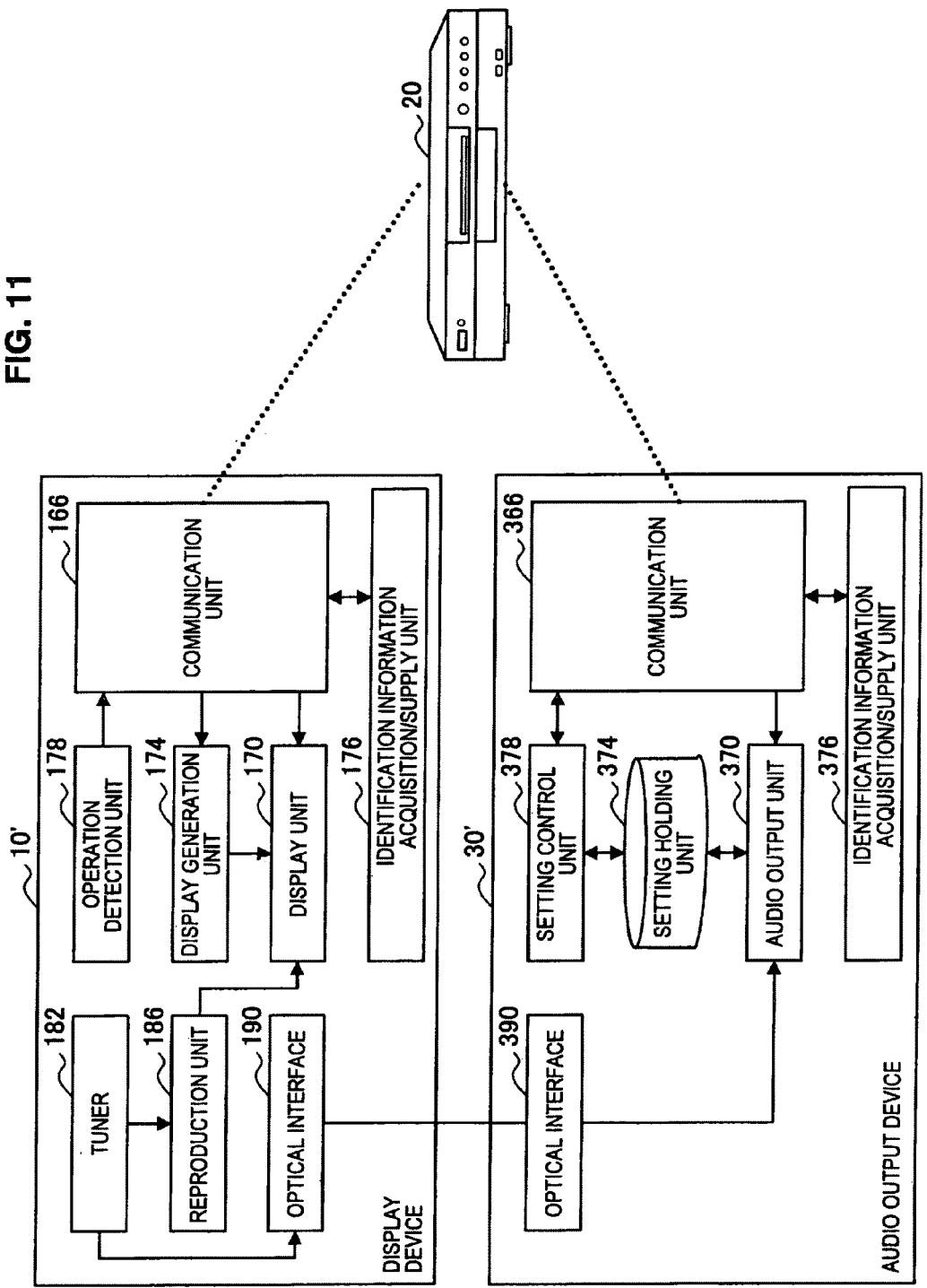
FIG. 11 is a function block diagram showing a configuration example of an information processing system according to a modification.

FIG. 11 is a function block diagram showing the configuration of an information processing system according to a modification. As shown in FIG. 11, a display device 10' according to the modification includes the communication unit 166, the display unit 170, the display generation unit 174, the identification information acquisition/supply unit 176, the operation detection unit 178, a tuner 182, a reproduction unit 186, and an optical interface 190. An audio output device 30' according to the modification includes the communication unit 366, the audio output unit 370, the setting holding unit 374, the identification information acquisition/supply unit 376, the setting control unit 378, and an optical interface 390.

By way of example, the display device 10' according to the modification acquires the video data and the audio data from the tuner 182, so that the reproduction unit 186 can reproduce the video data and the display unit 170 can display the video data reproduced by the reproduction unit 186.

The display device 10' and the audio output device 30' are connected by an optical cable through the optical interface 190 and the optical interface 390. The optical cable is a one-way transmission path for providing the audio data from the display device 10' to the audio output device 30'. The audio output unit 370 of the audio output device 30' can perform the audio output based on the audio data provided from the display device 10' through the optical interface 390.

Therefore, although the display device 10' and the audio output device 30' according to the modification are connected through the optical interface 190 and the optical interface 390, transmission from the audio output device 30' to the display device 10' may not be carried out with the relevant transmission path. Thus, it is difficult for the display device 10' and the audio output device 30' to directly communicate and for the display device 10' to display a setting change screen of the audio output device 30'.

In the relevant modification as well, the source device 20 relays the communication between the display device 10' and the audio output device 30' so that the change in the setting of the audio output device 30' can be realized in the flow shown in FIG. 7. In other words, the setting can be changed by causing the display device 10' to display the setting change screen of the audio output device 30, and the user to operate the remote controller 106 in the relevant setting change screen.

Furthermore, in this modification as well, the source device 20 relays the communication between the display device 10' and the audio output device 30' so that the switching operation of the source device 20, the audio output switching operation and the volume increase/decrease operation from the display device 10' to the audio output device 30' and the like can be carried out from the display device 10'.

<5. Operation at Time of Identification Information Exchange (At Time of Pairing Setting)>

Figure 12:
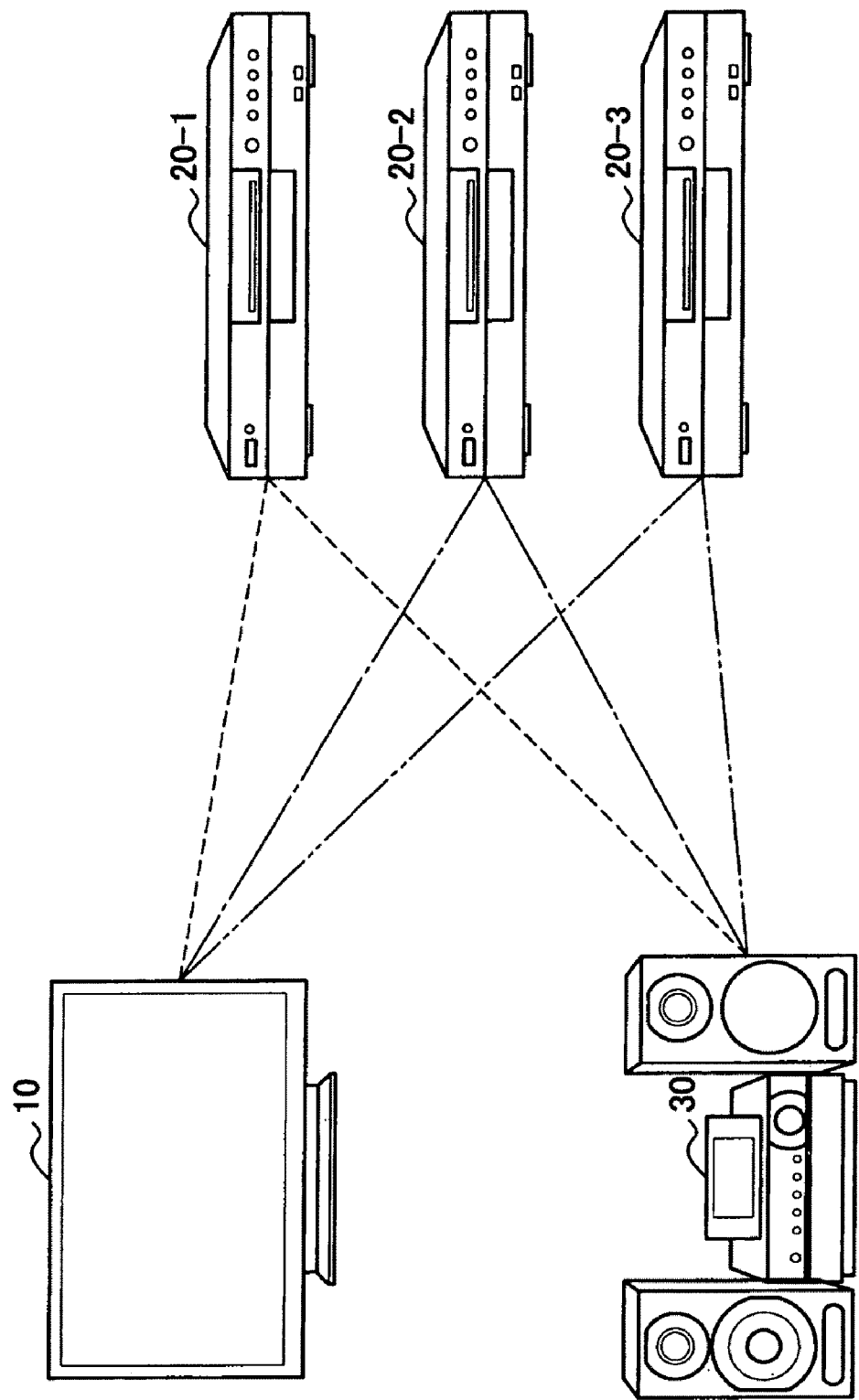
FIG. 12 is a view showing a system configuration (network configuration) describing the operation at the time of identification information exchange (at the time of pairing setting).

The operation at the time of pairing setting of exchanging identification information (identification information unique to device such as device ID) between the display device 10 and the audio output device 30 to be corresponded (pairing) will now be described with reference to FIGS. 12 to 18. As shown in FIG. 12, a case in which N source devices 20-1 to 20-N exist for the source device to which the display device 10 and the audio output device 30 can be connected will be described.

Figure 13:
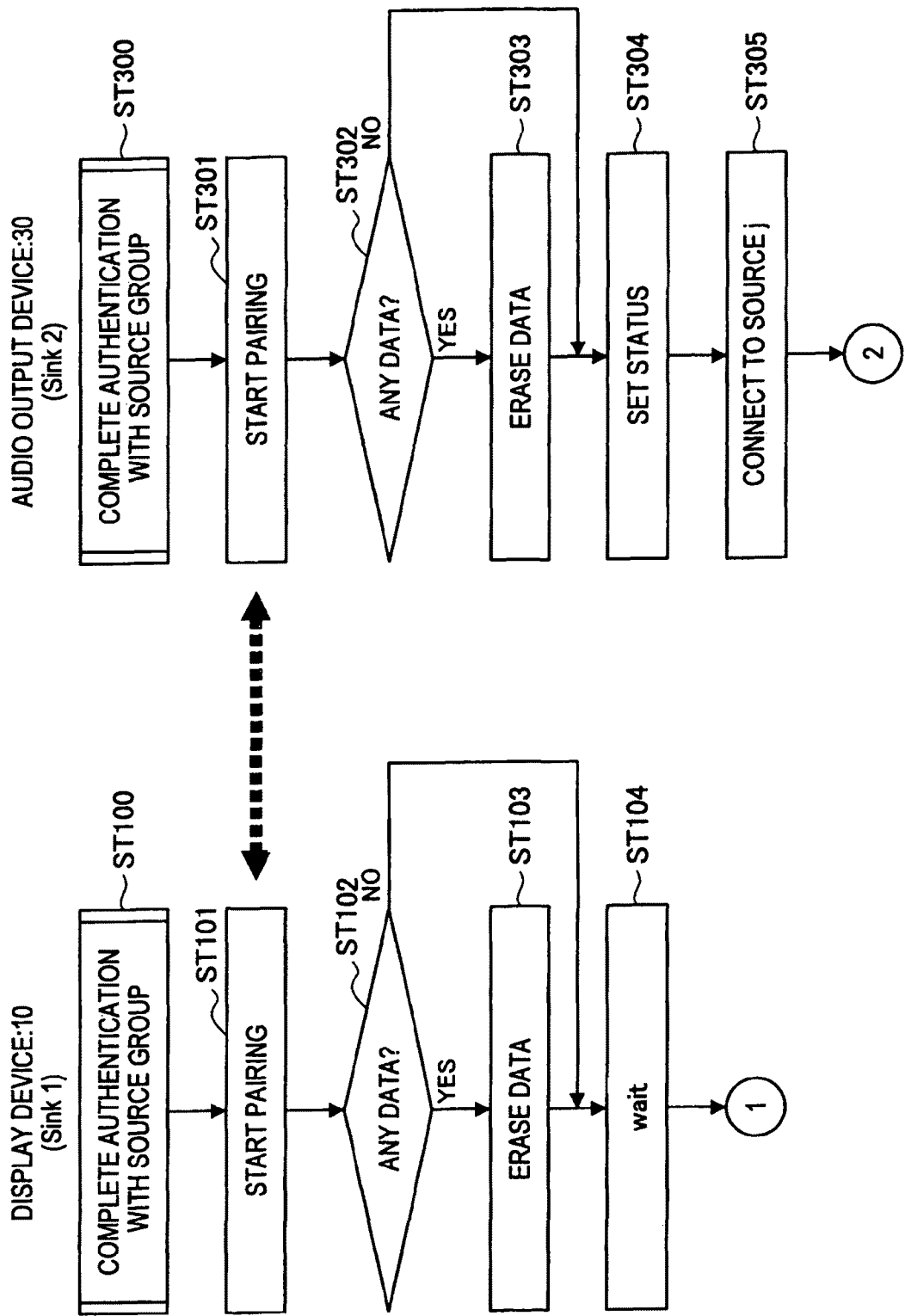
FIG. 13 is a flowchart (1/3) showing the flow of the pairing setting operation in the display device (Sink1) and the audio output device (Sink 2).
Figure 14:
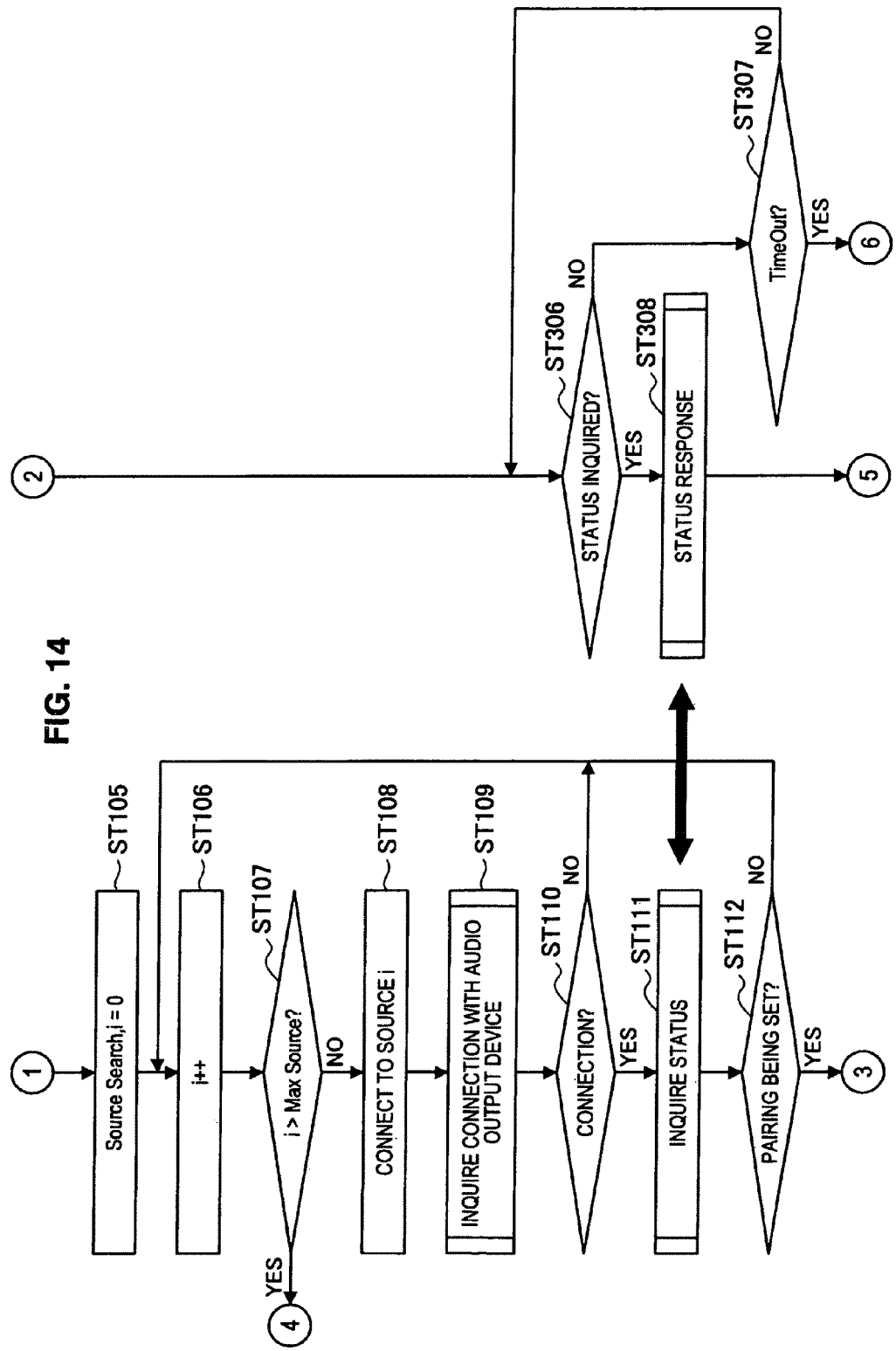
FIG. 14 is a flowchart (2/3) showing the flow of the pairing setting operation in the display device (Sink1) and the audio output device (Sink 2).
Figure 15:
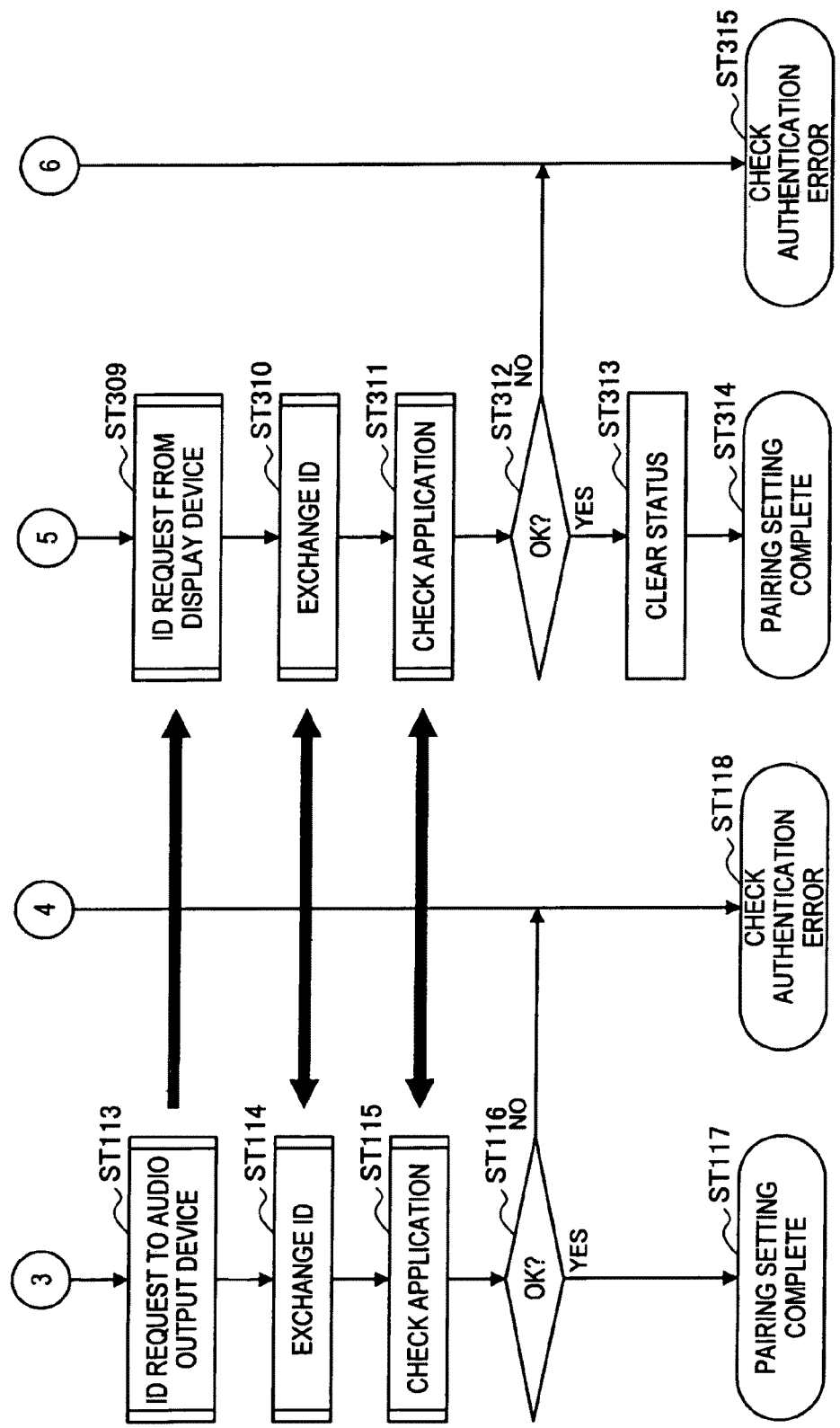
FIG. 15 is a flowchart (3/3) showing the flow of the pairing setting operation in the display device (Sink1) and the audio output device (Sink 2).

The flowcharts of FIGS. 13 to 15 show the flow of the pairing setting operation between the display device 10 (Sink1) and the audio output device 30 (Sink 2).

In step ST100, the display device 10 finishes the connection authentication task with the source device necessary for the connection in advance so that the connection with the source device can be freely performed on the network. In this case, the display device 10 performs the connection authentication task with a predetermined number of source devices, to which the relevant display device 10 can be connected, of the N source devices 20-1 to 20N.

Similarly, the audio output device 30 finishes the connection authentication task with the source device necessary for the connection in advance in step ST300 before starting the pairing setting operation so that the connection with the source device can be freely performed on the network. In this case, the audio output device 30 performs the connection authentication task with a predetermined number of source devices, to which the relevant audio output device 30 can be connected, of the N source devices 20-1 to 20N.

In step ST101, the display device 10 starts the pairing setting operation based on the start instruction of the pairing setting from the user. In step ST301, the audio output device 30 starts the pairing setting operation based on the start instruction of the pairing setting from the user. In other words, the pairing setting operation in the display device 10 and the audio output device 30 starts when the start of the pairing setting is instructed from the user with respect to both devices.

The start instruction of the pairing setting from the user to each device may be realized when the device supporting the pairing each has a pairing setting button and the user pushes the same. In the case of the display device 10, the start instruction of the pairing setting may be realized by providing the item of such state setting to the setting item of the control input GUI. In the case of the audio output device 30, the start instruction of the pairing setting may be realized by providing the pairing execution mode in the parameter setting menu. The user can determine the devices to correspond and start the pairing setting operation by mounting the function, which the user directly instructs, to each pairing target device.

The display device 10 starts the pairing setting operation in step ST101, and then determines whether or not the pairing data exist in step ST 102. The pairing data is the identification information such as the device ID of the other device corresponded with the own device acquired by the past pairing operation, and furthermore, the logical address of the other device acquired thereafter in correspondence with the identification information, and the like.

If the pairing data exists, the display device 10 erases the pairing data in step ST103. If the old pairing data is remaining when newly redoing the pairing with respect to the already paired devices, and the like, such data is cleared.

The display device 10 proceeds to the process of step ST104 after the process of step ST103. If the pairing data does not exist in step ST102, the display device 10 immediately proceeds to the process of step ST104.

Similarly, the audio output device 30 starts the pairing setting operation in step ST301, and then determines whether or not the pairing data exists in step ST302. If the pairing data exists, the audio output device 30 erases the relevant pairing data in step ST303. The audio output device 30 proceeds to the process of step ST304 after the process of step ST303. If the pairing data does not exist in step ST302, the audio output device 30 immediately proceeds to the process of step ST304.

In step ST304, the audio output device 30 sets the status of "in pairing setting", and the like. In step ST305, the audio output device 30 connects to an arbitrary source device (Source j) of a predetermined number of connectable source devices performed with the connection authentication task in step ST300. The source device to be connected also needs to be connected to the display device 10 at the same time, and thus the source device needs to support the simultaneous connection with a plurality of devices.

In step ST104, the display device 10 thereafter proceeds to the process of step ST105 after waiting for a predetermined time. The display device 10 starts the processes after step ST105 after the audio output device 30 connects to the arbitrary source device (Source j) in step ST305 by waiting for a predetermined time.

In step ST105, the display device 10 searches for the connectable source device performed with the connection authentication task in step ST100 on the network, and lists up all the devices. The number of source devices that are listed up is Max Source. The display device 10 sets to i=0 in step ST105.

The display device 10 lists up the connectable source devices in step ST105, and connects to the source device in order from the top of the list. The display device 10 may also connect to the source device found in sequence without creating a list. After connecting to the source device, the display device 10 inquires the connected source device whether or not the connection with the audio output device 30 is also established. If reported from the source device that the connection with the audio output device 30 is not established, the display device 10 releases such connection, connects to the next source device in the list, and similarly investigates the presence of the connection with the audio output device 30. This is repeated so that the display device 10 can specify the source device connected with the audio output device 30.

After specifying the source device that has a connection with the audio output device 30, the display device 10 then inquires the status to the connected audio output device 30 through the source device. The display device 10 releases the connection with the source device if the status of "in pairing setting" is not reported from the audio output device 30 and connects to the next source device in the list. The source device connected with the audio output device 30 of the pairing setting target, that is, the audio output device 30 having the status "in pairing setting" is thereby specified.

In other words, after listing up the connectable source devices in step ST105, the display device 10 increments i in step ST106. The display device 10 determines whether or not i>Max Source in step ST107. If not i>Max Source, this means that the source device to which the display device 10 can connect is still remaining.

If not i>Max Source in step ST107, the display device 10 connects to the i-th source device (Source i) in step ST108. In step ST109, the display device 10 inquires the source device (Source i) whether or not the connection with the audio output device 30 is also established.

The display device 10 then determines whether or not the source device (Source i) has a connection with the audio output device 30 based on the report from the source device (Source i) in step ST110. If the source device (Source i) does not have a connection with the audio output device 30, the display device 10 returns to the process of step ST106, and proceeds to the process with respect to the next source device.

If the source device (Source i) has a connection with the audio output device 30, the display device 10 inquires the status to the connected audio output device 30 through the source device (Source i) in step ST111. The display device 10 determines in step ST112 whether or not the audio output device 30 is in the status "in pairing setting" based on the response from the audio output device 30.

If not in the status "in pairing setting", the display device 10 returns to the process of step ST106, and proceeds to the process with respect to the next source device. If in the status "in pairing setting", the display device 10 specifies the source device (Source i) as the source device connected with the audio output device 30 of the pairing setting target, and thereafter proceeds to the process of step ST113.

After connecting to the arbitrary source device (Source j) in step ST305, the audio output device 30 proceeds to the process of step ST306. In step ST306, the audio output device 30 determines whether or not an inquiry on the status is made from the display device 10. If the inquiry on the status is not made, determination is made whether or not a constant time has elapsed from the connection to the source device (Source j) and is time out (Time Out) in step ST307. If not time out, the audio output device 30 returns to the process of step ST306.

If the inquiry on the status is made from the display device 10 in step ST306, the audio output device 30 responds to the display device 10 through the source device (Source j) that the status is "in pairing setting" in step ST308, and then proceeds to the process of step ST309.

As described above, the identification information such as the identification information unique to the device including the device ID and the like is exchanged between the display device 10 and the audio output device 30 after the source device (Source i) to which the audio output device 30 of the pairing setting target is connected is specified in the display device 10. The identification information exchanged here is assumed as the "device ID".

In other words, the display device 10 transmits a request for the device ID to the audio output device 30 through the source device (Source i) in step ST113. The audio output device 30 receives the request for the device ID from the display device 10 in step ST309. The display device 10 then exchanges the device ID in step ST114 and the audio output device 30 exchanges the device ID in step ST310 with respect to each other through the source device (Source i), and stores the same in the memory etc. of the own device. The pairing setting, that is, the exchange of identification information is realized in such a manner.

However, the user may have to check the pairing setting at the end. In such a case, for example, an audio such as a test tone is emitted from the audio output device 30 and some kind of message is displayed on the display device 10 to request the user for the checking operation, so that the check can be carried out. If the checking operation of the user is to be carried out, the pairing setting is completed, and the audio output device 30 releases the status of "in pairing setting".

In other words, the display device 10 acquires the device ID (identification information) of the audio output device 30 in step ST114, and then performs a process for the user to carry out the check on pairing such as displaying a message in step ST115. The display device 10 then determines whether or not the user has performed the "OK" operation of the pairing check in step ST116. If the user has performed the "OK" operation, the display device 10 completes the pairing setting in step ST117. If the user has not performed the "OK" operation, the display device 10 proceeds to the process of step ST118.

The audio output device 30 acquires the device ID (identification information) of the display device 10 in step ST310, and then performs a process for the user to carry out the pairing check such as outputting audio such as a test tone in step ST311. The audio output device 30 then determines whether or not the user has performed the "OK" operation of the pairing check in step ST312. If the user has performed the "OK" operation, the display device 10 releases the status of "in pairing setting" in step ST313, and completes the pairing setting in step ST314. If the user has not performed the "OK" operation, the audio output device 30 proceeds to the process of step ST315.

In the connection authentication task of the display device 10 and the audio output device 30 (step ST100, step ST300), a case in which both devices are not in a connectable state to the same source device is also considered. In this case, it is recognized from the time out of when the audio output device 30 waits for the status inquiry from the display device 10, or when the display device 10 is unable to find the audio output device 30 of the pairing target even if connected to all the source devices in the list. In such a case, a message urging the user for the connection authentication check may be notified.

In other words, the display device 10 proceeds to the process of step ST118 when i>Max Source in step ST107. In step ST118, the display device 10 displays a message urging the connection authentication check (authentication error check) to the user. The audio output device 30 proceeds to the process of step ST315 when in time out in step ST307. In step ST315, the audio output device 30 urges the connection authentication check (authentication error check) to the user by turning ON the light emitting element such as the LED or outputting audio.

Figure 16:
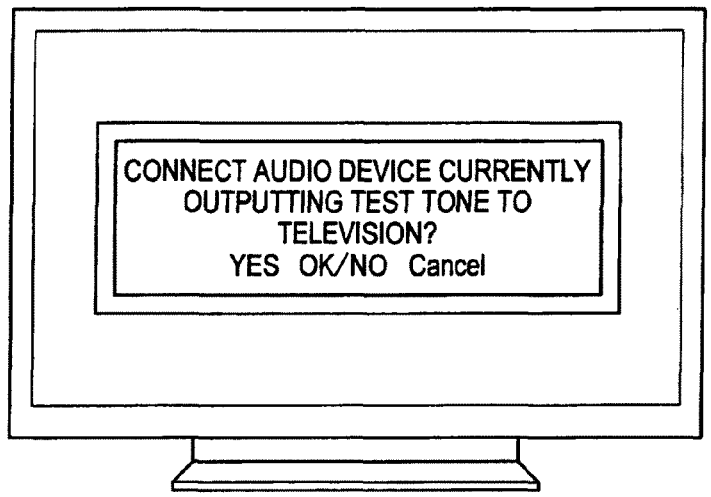
FIG. 16 is a view showing a display example of a message for ultimately urging the pairing check to the user in the display device.

FIG. 16 shows a display example of a message for ultimately urging the pairing check to the user in the display device 10. The display device 10 displays a message as shown in FIG. 16 in step ST115, and urges the user to input the [OK] button or the [Cancel] button on the remote controller 106. The audio output device 30 simultaneously outputs a typical audio such as some kind of test tone. A visual GUI is provided in the display device 10 and an auditory typical audio is provided from the audio output device 30, so that the user can perceptually check whether the pairing of the devices is as desired.

Figure 17:
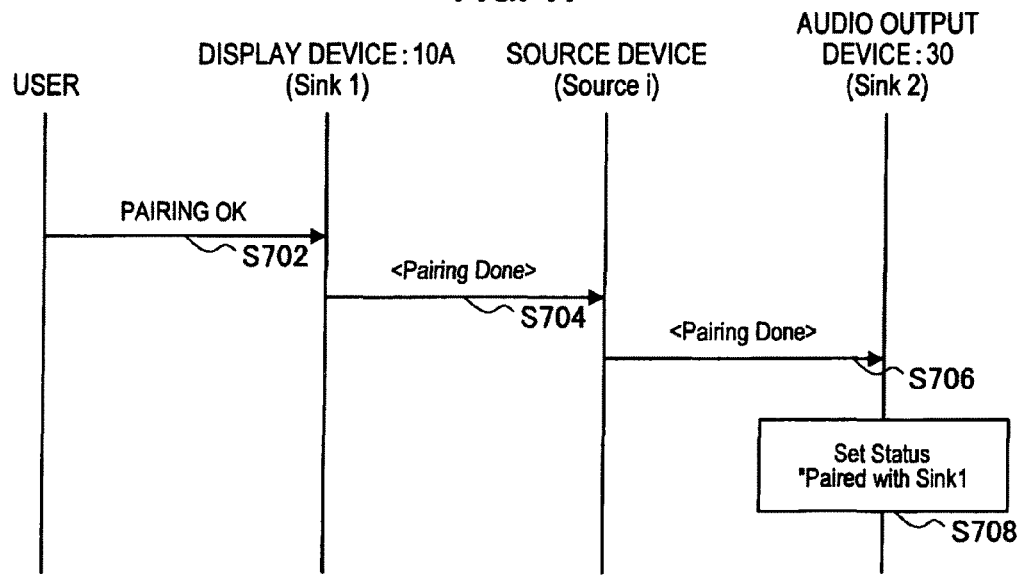
FIG. 17 is a sequence chart showing one example of a result process of a user check application.

FIG. 17 is a sequence chart showing one example of a result process of a user check application. First, as shown in FIG. 17, when the operation of "pairing OK" by the user is detected by the operation detection unit 178 of the display device 10 (S702), the communication unit 166 of the display device 10 transmits a command <Pairing Done> of (9) to the source device (Source i) and requests for a relay (S704).

<Pairing Done><Sink1 address><Source address><Sink2 address>　　　(9)

In the command <Pairing Done>, <Pairing Done> indicates that it is the command for notifying that the pairing is completed. In the command <Pairing Done>, <Sink1 address> represents the address of the command issuing source (display device 10), <Source address> represents the address of the destination (source device (Source i)) of the command, and <Sink2 address> represents the address of the command target sink (audio output device 30).

The relay processing unit 278 of the source device (Source i) that has received the command <Pairing Done> of (9) transmits a command <Pairing Done> of (10) to the audio output device 30 of the command target sink for relay (S706).

<Pairing Done><Source address><Sink2 address>　　　(10)

In the command <Pairing Done>, <Pairing Done> indicates that it is the command for notifying that the pairing is completed. In the command <Pairing Done>, <Source address> represents the address of the issuing source (source device (Source i)) of the command, and <Sink2 address> represents the address of the destination (audio output device 30) of the command.

The audio output device 30 that has received the command <Pairing Done> of (10) changes the status of the own device from "in pairing setting" to "pairing complete" (S708). The display device 10 and the audio output device 30 then store the respectively exchanged device ID in the memory etc. of the own device, and complete the pairing setting.

Since the initiator of the cooperative control is usually the display device 10, the paired audio output device 30 on the display device 10 side is to be one. However, the audio output device 30 side may specify the issuing source at the time of receiving the command, and hence may be paired with a plurality of display devices 10 or may not store the device ID of the display device 10.

As described above, the display device 10 may inquire the status to the audio output device 30 and receive the response thereof (step ST111, step ST308) through the source device (Source i) if the connected source device (Source i) has a connection with the audio output device 30. When the audio output device 30 is in the status of "in pairing setting", the display device 10 exchanges the device ID (identification information) (step ST114, step ST310) through the source device (Source i).

Figure 18:
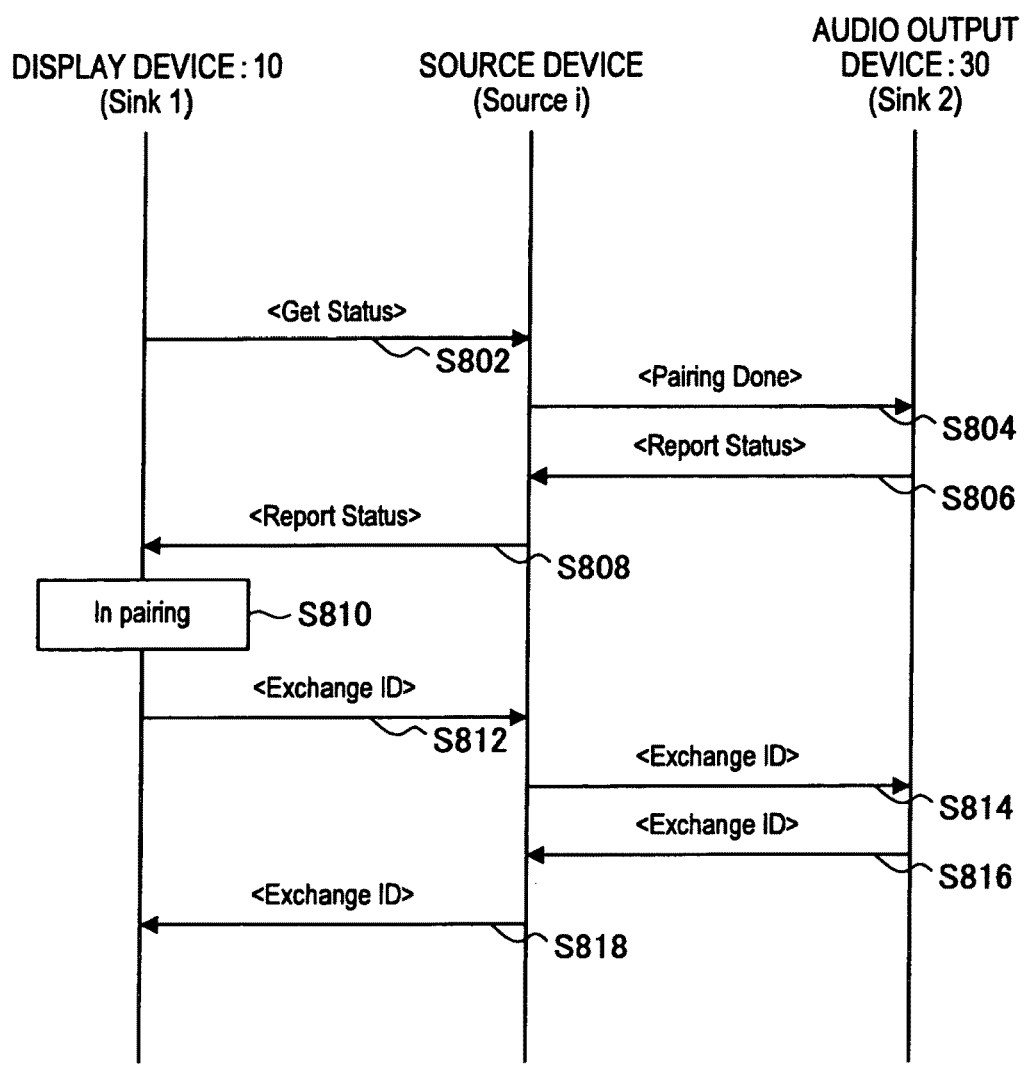
FIG. 18 is a sequence chart showing the flow of the status inquiring operation and the device ID (identification information) exchanging operation of the audio output device.

FIG. 18 is a sequence chart showing the flow of the status inquiring operation and the device ID (identification information) exchanging operation of the audio output device 30.

The communication unit 166 of the display device 10 transmits a command <Get Status> of (11) to the source device (Source i) and requests for a relay (S802).

<Get Status><Sink1 address><Source address><Sink2 address><Status Name(Pairing)>　　　(11)

In the command <Get Status>, <Get Status> indicates that it is a command for inquiring the status indicated by <Status Name (Pairing in this case)>. In the command <Get Status>, <Sink1 address> represents the address of the command issuing source (display device 10), <Source address> represents the address of the destination (source device (Source i)) of the command, and <Sink2 address> represents the address of the command target sink (audio output device 30).

The addresses in the command <Get Status> and the following commands and responses are logical addresses allocated on the network configured by the display device 10, the source devices 20-1 to 20-N, and the audio output device 30. The display device 10 acquires the address <Sink2 address> of the audio output device 30 from the source device (Source i) at the stage of inquiring the source device (Source i) on the connection with the audio output device 30 in step ST109.

The relay processing unit 278 of the source device (Source i) that has received the command <Get Status> of (11) transmits a command <Get Status> of (12) to the audio output device 30 or the command target sink for relay (S804).

<Get Status><Source address><Sink2 address><Status Name(Pairing)> (12)

In the command <Get Status>, <Get Status> indicates that it is a command for inquiring the status indicated by <Status Name (Pairing in this case)>. In the command <Get Status>, <Source address> represents the address of the command issuing source (source device (Source i)), and <Sink2 address> represents the address of the destination (audio output device 30) of the command.

The communication unit 166 of the audio output device 30 that has received the command <Get Status> of (12) transmits a response <Report Status> of (13) added with the information indicating the pairing state to the source device (Source i) and requests for a relay (S806).

<Report Status><Sink2 address><Source address><Status(Pairing)> (13)

In the response <Report Status>, <Report AStatus> indicates notifying <Status (state of pairing in this case)> as a response to the command <Get Status> received immediately before. The pairing state includes "in pairing setting", "paired", and "non-paired". In the response <Report Status>, <Sink2 address> represents the address of the response issuing source (audio output device 30), and <Source address> represents the address of the destination (source device (Source i)) of the response. In the response <Report Status>, <Status(Pairing)> is information indicating the pairing state of the audio output device 30.

With the reception of the command <Get Status> from the display device 10, as described above, the source device (Source i) already recognizes that the response <Report Status> thereto is to be relayed to the display device 10. Thus, the relay processing unit 278 of the source device (Source i) that has received the response <Report Status> of (13) transmits a response <Report Status> of (14) to the display device 10 or the response target sink for relay (S808). This may be realized by issuing a relay request command similar to the command <Get Status> of (11) to the source device (Source i) so as to relay from the audio output device 30 side to the display device 10.

<Report Status><Source address><Sink1 address><Status(Pairing)> (14)

In the response <Report Status>, <Report Status> notifies the <Status (state of pairing in this case)> as a response to the command <Get Status> received immediately before. In the response <Report Status>, <Source address> represents the address of the response issuing source (source device (Source i)), and <Sink1 address> represents the address of the destination (display device 10) of the response.

The display device 10 that has received the response <Report Status> of (14) determines whether or not the audio output device 30 is "in pairing setting", that is, whether or not the pairing setting target based on the <Status (Pairing)>. If the status is not "in pairing setting", the source device is switched to the next source device in the list, and the same flow is repeated from the process of determining the presence of connection of the audio output device 30.

If the status is "in pairing setting", the display device 10 can determine that the audio output device 30 is the pairing setting target (S810). The communication unit 166 of the display device 10 then transmits a command <ExchangeID> of (15) added with the device ID of the own device to the source device (Source i) and requests for a relay (S812).

<ExchangeID><Sink1 address><Source address><Sink2 address><Sink1 ID> (15)

In the command <ExchangeID>, <ExchangeID> indicates that it is a command for exchanging the device ID. In the command <ExchangeID>, <Sink1 address> represents the address of the command issuing source (display device 10), <Source address> represents the address of the destination (source device (Source i)) of the command, and <Sink2 address> represents the address of the command target sink (audio output device 30). In the command <ExchangeID>, <Sink1 ID> indicates the device ID of the display device 10.

The relay processing unit 278 of the source device (Source j) that has received the command <ExchangeID> of (15) transmits a command <ExchangeID> of (16) added with the device ID of the display device 10 to the audio output device 30 or the command target sink for relay (S814).

<ExchangeID><Source address><Sink2 address><Sink1 ID> (16)

In the command <ExchangeID>, <ExchangeID> indicates that it is a command for exchanging the device ID. In the command <ExchangeID>, <Source address> represents the address of the command issuing source (source device (Source i)), and <Sink2 address> represents the address of the destination (audio output device 30) of the command. In the command <ExchangeID>, <Sink1 ID> indicates the device ID of the display device 10.

The audio output device 30 that has received the command <ExchangeID> of (16) acquires the device ID of the display device 10 by the <Sink1 ID>. The audio output device 30 then transmits a response <ExchangeID> of (17) added with the device ID of the own device to the source device (Source i), and requests for a relay (S816).

<ExchangeID><Sink2 address><Source address><Sink2 ID> (17)

In the response <ExchangeID>, <ExchangeID> indicates that it is a response to the command <ExchangeID> received immediately before. In the response <ExchangeID>, <Sink2 address> represents the address of the response issuing source (audio output device 30), and <Source address> represents the address of the destination (source device (Source i)) of the response. In the response <ExchangeID>, <Sink2 ID> indicates the device ID of the audio output device 30.

With the reception of the command <ExchangeID> from the display device 10, as described above, the source device (Source i) already recognizes that the response <ExchangeID> thereto is to be relayed to the display device 10. Thus, the relay processing unit 278 of the source device (Source i) that has received the response <ExchangeID> of (17) transmits a response <ExchangeID> of (18) added with the device ID of the audio output device 30 to the display device 10 or the response target sink for relay (S818). This may be realized by issuing a relay request command similar to the command <ExchangeID> of (15) to the source device (Source i) so as to relay from the audio output device 30 side to the display device 10.

<ExchangeID><Source address><Sink1 address><Sink2 ID> (18)

In the response <ExchangeID>, <ExchangeID> indicates that it is a response to the command <ExchangeID> received immediately before. In the response <ExchangeID>, <Source address> represents the address of the response issuing source (source device (Source i)), and <Sink1 address> represents the address of the destination (display device 10) of the response. In the response <ExchangeID>, <Sink2 ID> indicates the device ID of the audio output device 30.

The display device 10 that has received the command <ExchangeID> of (18) acquires the device ID of the audio output device 30 by <Sink2 ID>. The display device 10 and the audio output device 30 exchange the device ID in this manner, so that the pairing is completed and a respectively cooperative control can be carried out.

In the description made above, an example in which one display device 10 and one audio output device 30 are pairing set is shown. However, if a television receiver and a projector are arranged in a room as display devices 10 and are used by being switched depending on the content, one audio output device 30 may be paired to each of the television receiver and the projector. Thus, a plurality of display devices 10 that are not simultaneously used can execute the control of the System Audio and the like in cooperation with one audio output device 30.

Furthermore, in a case of simultaneously switching the input source when projecting the same content with a plurality of projectors and television receivers in a large conference room, a sink device for recognizing the issuing of the command from the user and all other sink devices can be paired. In this case, the sink device for recognizing the issuing of the command from the user grasps the device ID (address) of all other sink devices being connected, and thus the input source can be simultaneously switched when the source device executes the relay of the command to all other sink devices being connected.

<6. Supplement>

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the embodiment described above, the audio output device 30 has been described as an example of an output device, but the present invention is not limited to such example. As a modification, the output device corresponded with the display device 10 may be other display devices. In this case, the source device 20 relays the communication among a plurality of display devices, so that the present invention can also be applied to changing the setting of other display devices in the display device 10 and changing the setting of the display device 10 in other display devices.

Each step in the processes of the information processing system 1 of the present specification may not be processed in time-series along the order described in the sequence charts. For example, each step in the processes of the information processing system 1 may be processed in parallel or in a different order.

A computer program for causing the hardware such as the CPU 108 and the SDRAM 114 incorporated in the display device 10 to exhibit the functions same as each configuration of the display device 10 described above may be created. Similarly, a computer program for causing the hardware such as the CPU 201, the ROM 202, and the RAM 203 incorporated in the source device 20 to exhibit the functions same as each configuration of the source device 20 described above may be created. A storage medium having stored the computer program therein is also provided. Each function block shown in the function block diagrams of FIGS. 4 and 11 may be configured by hardware to realize a series of processes with hardware.

The invention claimed is:

1. An information processing system comprising:
   an information processing device for transmitting output data of a content;
   an output device for performing an output based on the output data transmitted from the information processing device; and
   a display device including:
      a reception unit for receiving the output data transmitted from the information processing device;
      a display unit for performing a display based on the output data received by the reception unit;
      a transmission unit for transmitting a setting change request to the output device through the information processing device;
      a display generation unit for generating a setting change screen based on setting information transmitted from the output device through the information processing device according to the setting change request; and
      an operation detection unit for detecting a user operation,
   the transmission unit transmitting a content of setting change based on the user operation detected by the operation detection unit in the setting change screen to the output device through the information processing device.

2. The information processing system according to claim 1, wherein the information processing device transmits display data and audio data as the output data, and
   the output devices is an audio output device for outputting audio based on the audio data transmitted from the information processing device.

3. The information processing system according to claim 2, wherein the display device and the output device further include an interface of a communication path for transmitting audio data in one direction from the display device to the output device, and
   the output device outputs audio based on the audio data transmitted from the information processing device or the audio data transmitted from the display device through the interface.

4. The information processing system according to claim 2, wherein the setting change request is a setting change request of a parameter involved in the audio output of the output device.

5. The information processing system according to claim 1, wherein the setting change request transmitted from the transmission unit of the display device to the output device through the information processing device includes identification information of the output device.

6. The information processing system according to claim 5, wherein the display device further includes an identification information acquisition unit for acquiring the identification information of the output device.

7. The information processing system according to claim 6, wherein the display device includes:
   an operation detection unit for detecting the user operation instructing start of acquisition of the identification information of the output device;
   an information processing device specifying unit for specifying the information processing device connected with the output device from connectable information processing devices when the user operation is detected by the operation detection unit; and an identification information reception unit for receiving the identification information of the output device from the output device through the information processing device specified by the information processing device specifying unit.

8. A display device comprising:

a reception unit for receiving output data of a content transmitted from an information processing device;

a display unit for performing a display based on the output data received by the reception unit;

a transmission unit for transmitting a setting change request to an output device, which performs an output based on the output data, through the information processing device;

a display generation unit for generating a setting change screen based on setting information transmitted from the output device through the information processing device according to the setting change request; and an operation detection unit for detecting a user operation, wherein the transmission unit transmits a content of setting change based on the user operation detected by the operation detection unit in the setting change screen to the output device through the information processing device.

9. The display device according to claim 8, wherein the setting change request transmitted from the transmission unit to the output device through the information processing device includes identification information of the output device.

10. The display device according to claim 9, further comprising:

an identification information acquisition unit for acquiring the identification information of the output device.

11. The display device according to claim 10, further comprising:

an operation detection unit for detecting the user operation instructing start of acquisition of the identification information of the output device;

an information processing device specifying unit for specifying the information processing device connected with the output device from connectable information processing devices when the user operation is detected by the operation detection unit; and an identification information reception unit for receiving the identification information of the output device from the output device through the information processing device specified by the information processing device specifying unit.

12. An output device comprising:

a reception unit for receiving output data of a content transmitted from an information processing device;

an output unit for performing an output based on the output data received by the reception unit;

an identification information acquisition unit for acquiring identification information of another output device through the information processing device; and a transmission unit for sending a message added with the identification information acquired by the identification information acquisition unit or other identification information corresponding to the identification information to the other output device through the information processing device.

13. The output device according to claim 12, wherein the message is a message instructing the other output device to switch the information processing device to receive the output data.

* * * * *